(12) United States Patent
Da Silva et al.

(10) Patent No.: US 12,563,460 B2
(45) Date of Patent: Feb. 24, 2026

(54) CANCELING OF CONDITIONAL PSCELL ADDITION

(71) Applicant: Telefonaktiebolaget LM Ericsson (publ), Stockholm (SE)

(72) Inventors: Icaro Leonardo J. Da Silva, Solna (SE); Cecilia Eklöf, Täby (SE); Julien Muller, Rennes (FR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 365 days.

(21) Appl. No.: 18/028,777

(22) PCT Filed: Sep. 28, 2021

(86) PCT No.: PCT/IB2021/058851
§ 371 (c)(1),
(2) Date: Mar. 28, 2023

(87) PCT Pub. No.: WO2022/064469
PCT Pub. Date: Mar. 31, 2022

(65) Prior Publication Data
US 2023/0370915 A1     Nov. 16, 2023

Related U.S. Application Data

(60) Provisional application No. 63/084,308, filed on Sep. 28, 2020.

(51) Int. Cl.
*H04W 36/00*          (2009.01)
(52) U.S. Cl.
CPC ... *H04W 36/0079* (2018.08); *H04W 36/0069* (2018.08)
(58) Field of Classification Search
None
See application file for complete search history.

(56) References Cited

U.S. PATENT DOCUMENTS

| | | | |
|---|---|---|---|
| 2020/0396661 A1 | 12/2020 | Wu | |
| 2022/0408322 A1* | 12/2022 | Uchino | H04W 76/10 |
| | | | 370/331 |

(Continued)

FOREIGN PATENT DOCUMENTS

| | | |
|---|---|---|
| WO | 2019161742 A1 | 8/2019 |
| WO | 2022029727 A1 | 2/2022 |

OTHER PUBLICATIONS

ZTE. "R3-195117 TP for BLCR for TS 36.423 Conditional PSCell SCR Cancel in EN-DC" 3GPP TSG RAN WG3#105bis, Oct. 14-18, 2019, Chongping, China, 10 pages (Year: 2019).*

(Continued)

*Primary Examiner* — Derrick W Ferris
(74) *Attorney, Agent, or Firm* — Withrow & Terranova, PLLC

(57) ABSTRACT

Systems and methods are disclosed herein for cancellation of Conditional Primary Secondary Cell (PSCell) Addition (CPA) in a cellular communications network. In one embodiment, a method performed by a secondary node comprises receiving a request from a master node for a conditional secondary node addition, the request comprising information that indicates a request for CPA for one or more PSCells. The method further comprises transmitting, to the master node, a response to the request that confirms that a User Equipment (UE) may be accepted for CPA for the one or more PSCells unless a canceling indication is later received and sending, to the master node, a message that indicates that the CPA is cancelled for at least one of the one or more PSCells. In this manner, the secondary node to cancel an already prepared CPA.

12 Claims, 17 Drawing Sheets

(56) References Cited

U.S. PATENT DOCUMENTS

2023/0171652 A1* 6/2023 Zhang ............... H04W 36/0061
370/331
2023/0284105 A1* 9/2023 Stanczak ........... H04W 36/0069
370/331
2023/0328618 A1* 10/2023 Selvaganapathy .. H04W 36/362
370/331

OTHER PUBLICATIONS

Author Unknown, "Technical Specification Group Radio Access Network; Evolved Universal Terrestrial Radio Access (E-UTRA); Radio Resource Control (RRC); Protocol specification (Release 16)," Technical Specification 36.331, Version 16.1.1, Jul. 2020, 3GPP Organizational Partners, 1,078 pages.

Author Unknown, "Technical Specification Group Radio Access Network; Evolved Universal Terrestrial Radio Access Network (E-UTRAN); X2 application protocol (X2AP) (Release 16)," Technical Specification 36.423, Version 16.2.0, Jul. 2020, 3GPP Organizational Partners, 489 pages.

Author Unknown, "Technical Specification Group Radio Access Network; Evolved Universal Terrestrial Radio Access (E-UTRA) and NR; Multi-connectivity; Stage 2 (Release 16)," Technical Specification 37.340, Version 16.2.0, Jul. 2020, 3GPP Organizational Partners, 78 pages.

Author Unknown, "Technical Specification Group Radio Access Network; NR; NR and NG-RAN Overall Description; Stage 2 (Release 16)," Technical Specification 38.300, Version 16.2.0, Jul. 2020, 3GPP Organizational Partners, 148 pages.

Author Unknown, "Technical Specification Group Radio Access Network; NR; Radio Resource Control (RRC) protocol specification (Release 16)," Technical Specification 38.331, Version 16.1.0, Jul. 2020, 3GPP Organizational Partners, 906 pages.

Author Unknown, "Technical Specification Group Radio Access Network; NG-RAN; Xn application protocol (XnAP) (Release 16)," Technical Specification 38.423, Version 16.2.0, Jul. 2020, 3GPP Organizational Partners, 447 pages.

CATT, "R3-196725: Consideration on MN Initiated Conditional SN Change Procedure," 3GPP TSG-RAN3 Meeting #106, Nov. 18-22, 2019, Reno, Nevada, 4 pages.

NEC, et al., "R3-082685: Handover Cancellation," 3GPP TSG-RAN WG3 Meeting#61bis, Sep. 30-Oct. 3, 2008, Prague, Czech Republic, 5 pages.

ZTE, "R3-195110: Further Discussion on Conditional PScell&SCG Cancel in Addition Scenario," 3GPP TSG RAN WG3#105bis, Oct. 14-18, 2019, Chongqing, China, 2 pages.

ZTE, "R3-195117: TP for BLCR for TS 36.423 Conditional PScell &SCG Cancel in EN-DC," 3GPP TSG RAN WG3#105bis, Oct. 14-18, 2019, Chongqing, China, 10 pages.

International Search Report and Written Opinion for International Patent Application No. PCT/IB2021/058851, mailed Dec. 22, 2021, 22 pages.

CATT, "R3-196726: Consideration on SN Initiated Conditional SN Change Procedure," 3GPP TSG-RAN3 Meeting #106, Nov. 18-22, 2019, Reno, Nevada, 5 pages.

NEC, "R3-072280: HO Cancel Procedure," 3GPP TSG-RAN WG3#57 bis, Nov. 5-9, 2007, Jeju, Korea, 3 pages.

NTT DOCOMO, et al., "R3-195684: Possible discussion points on Conditional PScell addition/change," 3GPP TSG-RAN WG3 #105bis, Oct. 14-18, 2019, Chongqing, China, 9 pages.

ZTE, "R3-195111: Further Discussion on Conditional PScell&SCG Cancel in SN Change Scenario," 3GPP TSG RAN WG3#105bis, Oct. 14-18, 2019, Chongqing, China, 3 pages.

Examination Report for European Patent Application No. 21787046. 8, mailed Jun. 13, 2025, 7 pages.

* cited by examiner

CANCELING OF CONDITIONAL PSCELL ADDITION

RELATED APPLICATIONS

This application is a 35 U.S.C. § 371 national phase filing of International Application No. PCT/IB2021/058851, filed Sep. 28, 2021, which claims the benefit of provisional patent application Ser. No. 63/084,308, filed Sep. 28, 2020, the disclosures of which are hereby incorporated herein by reference in their entireties.

FIELD OF THE DISCLOSURE

The present disclosure relates to conditional Primary Secondary Cell (PSCell) additional (CPA) in a cellular communications network.

BACKGROUND

1 Conditional Handover (CHO)

Two new work items for mobility enhancements in Long Term Evolution (LTE) and New Radio (NR) have started in Third Generation Partnership Project (3GPP) in Release 16. The main objectives of the work items are to improve the robustness at handover and to decrease the interruption time at handover.

One problem related to robustness at handover is that the Handover (HO) Command (RRCConnectionReconfiguration with mobilityControlInfo and RRCReconfiguration with a reconfigurationWithSync field) is normally sent when the radio conditions for the User Equipment (UE) are already quite bad. As a result, the HO Command may not reach the UE in time if the message is segmented or there are retransmissions.

In LTE and NR, different solutions to increase mobility robustness have been discussed in the past. One solution discussed in NR is called "conditional handover" or "early handover command" In order to avoid the undesired dependence on the serving radio link upon the time (and radio conditions) when the UE should execute the handover, the possibility to provide Radio Resource Control (RRC) signaling for the handover to the UE earlier should be provided. To achieve this, it should be possible to associate the HO command with a condition e.g., based on radio conditions possibly similar to the ones associated to an A3 event, where a given neighbor cell or beam becomes X decibels (dB) better than the target cell or beam. As soon as the condition is fulfilled, the UE executes the handover in accordance with the provided handover command.

Such a condition could, e.g., be that the quality of the target cell or beam becomes X dB stronger than the serving cell. The threshold Y used in a preceding measurement reporting event should then be chosen lower than the one in the handover execution condition. This allows the serving cell to prepare the handover upon reception of an early measurement report and to provide the RRCConnectionReconfiguration with mobilityControlInfo at a time when the radio link between the source cell and the UE is still stable. The execution of the handover is done at a later point in time (and threshold) which is considered optimal for the handover execution.

FIG. 1 depicts an example of CHO execution with just a serving cell and a target cell. In practice, there may often be many cells or beams that the UE reported as possible candidates for handover based on its preceding Radio Resource Management (RRM) measurements. The network should then have the freedom to issue CHO commands for several of those candidates. The RRCConnectionReconfiguration for each of those candidates may differ, e.g., in terms of the HO execution condition (e.g., Reference Signal (RS) to measure and threshold to exceed) as well as in terms of the Random Access (RA) preamble to be sent when a condition is met.

While the UE evaluates the condition, it should continue operating per its current RRC configuration, i.e., without applying the CHO command. When the UE determines that the condition is fulfilled, it disconnects from the serving cell, applies the CHO command, and connects to the target cell. These steps are equivalent to the current, instantaneous handover execution.

While the UE evaluates the condition, it should continue operating per its current RRC configuration, i.e., without applying the CHO command. When the UE determines that the condition is fulfilled, it disconnects from the serving cell, applies the CHO command, and connects to the target cell. These steps are equivalent to the current, instantaneous handover execution.

Conditional handover is described in stage 2, 3GPP Technical Specification (TS) 38.300 in chapter 9.2.3.4, which is reproduced below.

***Stage 2, 3GPP TS 38.300, in Chapter 9.2.3.4***

9.2.3.4 Conditional Handover 9.2.3.4.1 General

A Conditional Handover (CHO) is defined as a handover that is executed by the UE when one or more handover execution conditions are met. The UE starts evaluating the execution condition(s) upon receiving the CHO configuration, and stops evaluating the execution condition(s) once the execution condition(s) is met.

The following principles apply to CHO:

The CHO configuration contains the configuration of CHO candidate cell(s) generated by the candidate gNB(s) and execution condition(s) generated by the source gNB.

An execution condition may consist of one or two trigger condition(s) (CHO events A3/A5, as defined in [12]). Only single RS type is supported and at most two different trigger quantities (e.g. RSRP and RSRQ, RSRP and SINR, etc.) can be configured simultaneously for the evaluation of CHO execution condition of a single candidate cell.

Before any CHO execution condition is satisfied, upon reception of HO command (without CHO configuration), the UE executes the HO procedure as described in clause 9.2.3.2, regardless of any previously received CHO configuration.

While executing CHO, i.e. from the time when the UE starts synchronization with target cell, UE does not monitor source cell.

CHO is not supported for NG-C based handover in this release of the specification.

9.2.3.4.2 C-Plane Handling

As in intra-NR RAN handover, in intra-NR RAN CHO, the preparation and execution phase of the conditional handover procedure is performed without involvement of the 5GC; i.e. preparation messages are directly exchanged between gNBs. The release of the resources at the source gNB during the conditional handover completion phase is triggered by the target gNB. The figure below depicts the basic conditional handover scenario where neither the AMF nor the UPF changes:

[Reproduced Herein as FIGS. 2A and 2B] Figure 9.2.3.4.2-1: Intra-AMF/UPF Conditional Handover 0/1. Same as step 0, 1 in Figure 9.2.3.2.1-1 of section 9.2.3.2.1.

2. The source gNB decides to use CHO.

3. The source gNB issues a Handover Request message to one or more candidate gNBs.

4. Same as step 4 in Figure 9.2.3.2.1-1 of section 9.2.3.2.1.

5. The candidate gNB sends HANDOVER REQUEST ACKNOWLEDGE message including configuration of CHO candidate cell to the source gNB.

6. The source gNB sends an RRCReconfiguration message to the UE, containing the configuration of CHO candidate cell(s) and CHO execution condition(s).

7. UE sends an RRCReconfigurationComplete message to the source gNB.

8. UE maintains connection with source gNB after receiving CHO configuration, and starts evaluating the CHO execution conditions for the candidate cell(s). If at least one CHO candidate cell satisfies the corresponding CHO execution condition, the UE detaches from the source gNB, applies the stored corresponding configuration for that selected candidate cell, synchronises to that candidate cell and completes the RRC handover procedure by sending RRCReconfigurationComplete message to the target gNB. The UE releases stored CHO configurations after successful completion of RRC handover procedure.

***End Stage 2, TS 38.300, in Chapter 9.2.3.4***

2 Cancellation in Conditional Handover

In 3GPP Rel-16, the possibility for a candidate target node to cancel one or multiple candidate target cells already prepared for a CHO has been standardized. A new Conditional Handover Cancel procedure was added to 3GPP TS 38.423 and is reproduced below:

***3GPP TS 38.423***

8.2.9.1 General

The Conditional Handover Cancel procedure is used to enable a target NG-RAN node to cancel an already prepared conditional handover.

The procedure uses UE-associated signalling.

8.2.9.2 Successful Operation

[Reproduced Herein as FIG. 3]

Figure 8.2.9.2-1: Conditional Handover Cancel, Successful Operation

The target NG-RAN node initiates the procedure by sending the CONDITIONAL HANDOVER CANCEL message to the source NG-RAN node. The target NG-RAN node shall indicate the reason for cancelling the conditional handover by means of an appropriate cause value. At the reception of the CONDITIONAL HANDOVER CANCEL message, the source NG-RAN node shall consider that the target NG-RAN node is about to remove any reference to, and release any resources previously reserved for candidate cells associated to the UE-associated signalling identified by the Source NG-RAN node UE XnAP ID IE and the Target NG-RAN node UE XnAP ID IE. If the Candidate Cells To Be Cancelled List IE is included in CONDITIONAL HANDOVER CANCEL message, the source NG-RAN node shall consider that only the resources reserved for the cells identified by the included NG-RAN CGI are about to be released.

8.2.9.3 Unsuccessful Operation

Not applicable.

8.2.9.4 Abnormal Conditions

If the CONDITIONAL HANDOVER CANCEL message refers to a context that does not exist, the source NG-RAN node shall ignore the message.

If one or more candidate cells in the Candidate Cells To Be Cancelled List IE included in the CONDITIONAL HANDOVER CANCEL message were not prepared using the same UE-associated signaling connection, the source NG-RAN node shall ignore those non-associated candidate cells.

***End 3GPP TS 38.423***

3 Primary Secondary Cell (PSCell) Addition

The UE can be configured with Dual Connectivity (DC), communicating both via a Master Cell Group (MCG) and a Secondary Cell Group (SCG). When the UE is configured with dual connectivity, the UE is configured with two Medium Access Control (MAC) entities: one MAC entity for the MCG and one MAC entity for the SCG. In Multi-Radio Dual Connectivity (MR-DC), the cell groups are located in two different logical nodes, i.e., different Next Generation Radio Access Network (NG-RAN) nodes, possibly connected via a non-ideal backhaul, one providing NR access and the other one providing either Evolved Universal Terrestrial Radio Access (E-UTRA) or NR access. One node acts as the Master Node (MN) and the other node acts as the Secondary Node (SN). The MN and SN are connected via a network interface, and at least the MN is connected to the core network. The operation in MR-DC involves different reconfiguration procedures, like secondary node addition, secondary node modification, secondary node release, and secondary node change.

In the following, the signaling flow from 3GPP TS 37.340 for the SN addition, leading to a PSCell addition, is shown.

***Start 3GPP TS 37.340**

10.2 Secondary Node Addition

The Secondary Node Addition procedure is initiated by the MN and is used to establish a UE context at the SN to provide resources from the SN to the UE. For bearers requiring SCG radio resources, this procedure is used to add at least the first cell of the SCG. This procedure can also be used to configure an SN terminated MCG bearer (where no SCG configuration is needed). Figure 10.2.1-1 shows the Secondary Node Addition procedure.

. . .

10.2.2 MR-DC with 5GC

The Secondary Node (SN) Addition procedure is initiated by the MN and is used to establish a UE context at the SN in order to provide resources from the SN to the UE. For bearers requiring SCG radio resources, this procedure is used to add at least the initial SCG serving cell of the SCG. This procedure can also be used to configure an SN terminated MCG bearer (where no SCG configuration is needed). Figure 10.2.2-1 shows the SN Addition procedure.

[Reproduced Herein as FIG. 4]

Figure 10.2.2-1: SN Addition Procedure

1. The MN decides to request the target SN to allocate resources for one or more specific PDU Sessions/QoS Flows, indicating QoS Flows characteristics (QoS Flow Level QoS parameters, PDU session level TNL address information, and PDU session level Network Slice info). In addition, for bearers requiring SCG radio resources, MN indicates the requested SCG configuration information, including the entire UE capabilities and the UE capability coordination result. In this case, the MN also provides the latest measurement results for SN to choose and configure the SCG cell(s). The MN may request the SN to allocate radio resources for split SRB operation. In NGEN-DC and NR-DC, the MN always provides all the needed security information to the SN (even if no SN terminated bearers are setup) to enable SRB3 to be setup based on SN decision.

For MN terminated bearer options that require Xn-U resources between the MN and the SN, the MN provides Xn-U UL TNL address information. For SN terminated bearers, the MN provides a list of available DRB IDs. The S-NG-RAN node shall store this information and use it when establishing SN terminated bearers. The SN may reject the request.

For SN terminated bearer options that require Xn-U resources between the MN and the SN, the MN provides in step 1 a list of QoS flows per PDU Sessions for which SCG resources are requested to be setup upon which the SN decides how to map QoS flows to DRB.

NOTE 1: For split bearers, MCG and SCG resources may be requested of such an amount, that the QoS for the respective QoS Flow is guaranteed by the exact sum of resources provided by the MCG and the SCG together, or even more. For MN terminated split bearers, the MN decision is reflected in step 1 by the QoS Flow parameters signalled to the SN, which may differ from QoS Flow parameters received over NG.

NOTE 2: For a specific QoS flow, the MN may request the direct establishment of SCG and/or split bearers, i.e. without first having to establish MCG bearers. It is also allowed that all QoS flows can be mapped to SN terminated bearers, i.e. there is no QoS flow mapped to an MN terminated bearer.

2. If the RRM entity in the SN is able to admit the resource request, it allocates respective radio resources and, dependent on the bearer type options, respective transport network resources. For bearers requiring SCG radio resources the SN triggers UE Random Access so that synchronisation of the SN radio resource configuration can be performed. The SN decides for the PSCell and other SCG SCells and provides the new SCG radio resource configuration to the MN within an SN RRC configuration message contained in the SN Addition Request Acknowledge message. In case of bearer options that require Xn-U resources between the MN and the SN, the SN provides Xn-U TNL address information for the respective DRB, Xn-U UL TNL address information for SN terminated bearers, Xn-U DL TNL address information for MN terminated bearers. For SN terminated bearers, the SN provides the NG-U DL TNL address information for the respective PDU Session and security algorithm. If SCG radio resources have been requested, the SCG radio resource configuration is provided.

NOTE 3: In case of MN terminated bearers, transmission of user plane data may take place after step 2.

NOTE 4: In case of SN terminated bearers, data forwarding and the SN Status Transfer may take place after step 2.

NOTE 5: For MN terminated NR SCG bearers for which PDCP duplication with CA is configured the MN allocates up to 4 separate Xn-U bearers.

For SN terminated NR MCG bearers for which PDCP duplication with CA is configured the SN allocates up to 4 separate Xn-U bearers.

2a. For SN terminated bearers using MCG resources, the MN provides Xn-U DL TNL address information in the Xn-U Address Indication message.

3. The MN sends the MN RRC reconfiguration message to the UE including the SN RRC configuration message, without modifying it.

4. The UE applies the new configuration and replies to MN with MN RRC reconfiguration complete message, including an SN RRC response message for SN, if needed. In case the UE is unable to comply with (part of) the configuration included in the MN RRC reconfiguration message, it performs the reconfiguration failure procedure.

5. The MN informs the SN that the UE has completed the reconfiguration procedure successfully via SN Reconfiguration Complete message, including the SN RRC response message, if received from the UE.

6. If configured with bearers requiring SCG radio resources, the UE performs synchronisation towards the PSCell configured by the SN. The order the UE sends the MN RRC reconfiguration complete message and performs the Random Access procedure towards the SCG is not defined. The successful RA procedure towards the SCG is not required for a successful completion of the RRC Connection Reconfiguration procedure.

7. If PDCP termination point is changed to the SN for bearers using RLC AM, and when RRC full configuration is not used, the MN sends the SN Status Transfer.

8. For SN terminated bearers or QoS flows moved from the MN, dependent on the characteristics of the respective bearer or QoS flow, the MN may take actions to minimise service interruption due to activation of MR-DC (Data forwarding).

9-12. If applicable, the update of the UP path towards the 5GC is performed via a PDU Session Path Update procedure.

***End 3GPP TS 37.340***

4 Conditional PSCell Change (CPC) Rel-16

A solution for Conditional PSCell Change (CPC) procedure was standardized in Rel-16. Therein, a UE operating in MR-DC receives, in a conditional reconfiguration, one or multiple RRC Reconfiguration(s) (e.g. an RRCReconfiguration message) containing an SCG configuration (e.g. an secondaryCellGroup of Information Element (IE) Cell-GroupConfig) with a reconfigurationWithSync that is stored and associated to an execution condition (e.g. a condition like an A3/A5 event configuration), so that one of the stored messages is only applied upon the fulfillment of the execution condition, e.g., associated with the serving PSCell, upon which the UE would perform PSCell change (in case it find a neighbor cell that is better than the current Special Cell (SpCell) of the SCG).

In Rel-16, CPC will be supported, but in Rel-17 PSCell Addition will also be included, i.e., Conditional PSCell Addition/Change (CPAC). In Rel-16, only intra-SN CPC without MN involvement is standardized. Inter-SN PSCell CPC and CPC with MN involvement will be included in Rel-17.

In rRel-16, only the case intra-SN case without MN involvement for CPC is supported, i.e. where Source SN (S-SN) and Target SN (T-SN) are the same node in FIG.

10.5.1-2 from 3GPP TS 37.340. That means that the cell is changed, but both the old and the new cell are in the same node. The agreements related to this procedure are described below.

***Start of 3GPP Agreements***

Agreements

0 We will prioritize work in SN-initiated PSCell change for conditional PSCell change.

1 Maintain Rel-15 principle that only one PScell is active at a time even with conditional PScell change.

2 For conditional PScell change, A3/A5 execution condition should be supported.

3 For conditional SN change, the source SN configuration can be used as the reference in generation of delta signalling for the candidate SNs.

4 Both the execution condition and the configuration for the candidate PSCell (as a container) can be included in the RRCReconfiguration message generated by the SN for intra-SN conditional PSCell change initiated by the SN (without MN involvement).

5 SRB1 can be used in all cases. SRB3 may be used to transmit conditional PScell change configuration to the UE for intra-SN change without MN involvement.

6 limit to intra-SN change without MN involvement (i.e. no MN reconfiguration or decision needed but SRB1 can be used) in Rel-16.

Same as for CHO, the Following were Agreed for CPC.

1. Usage of CPAC is decided by the network. The UE evaluates when the condition is valid.

2. Support configuration of one or more candidate cells for CPAC;

3 FFS how many candidate cells (UE and network impacts should be clarified). FFS whether the number of candidate cells for CPAC different from that of CHO.

4. Allow having multiple triggering conditions (using "and") for CPAC execution of a single candidate cell. Only single RS type per CPAC candidate is supported. At most two triggering quantities (e.g. RSRP and RSRQ, RSRP and SINR, etc.) can be configured simultaneously. FFS on UE capability.

5. Define an execution condition for conditional PSCell change by the measurement identity which identifies a measurement configuration.

6. Cell level quality is used as baseline for Conditional NR PSCell change execution condition, 7. Only single RS type (SSB or CSI-RS) per candidate PSCell is supported for PSCell change.

8. At most two triggering quantities (e.g. RSRP and RSRQ, RSRP and SINR, etc.) can be configured simultaneously. FFS on UE capability.

9. TTT is supported for CPAC execution condition (as per legacy configuration),

10. No additional optimizations with multi-beam operation are introduced to improve RACH performance for conditional PSCell change completion with multi-beam operation.

11. For FR1 and FR2, leave it up to UE implementation to select the candidate PSCell if more than one candidate cell meets the triggering condition. UE may consider beam information in this.

12. UE is not required to continue evaluating the triggering condition of other candidate PSCell(s) during conditional SN execution.

Agreements (RAN2 #109e)

1) Similar to CHO, the following applies to CPC-intra-SN configuration

Reuse the RRCReconfiguration/RRCConnectionReconfiguration procedure to signal CPC-intra-SN configuration to UE.

The MN is not allowed to alter any content of the configuration from the SN which is carried in an RRC container.

Multiple candidate PSCells can be sent in either one or multiple RRC messages.

Use add/mod list+release list to configure multiple candidate PSCells.

CPC-intra-SN execution condition and/or candidate PSCell configuration can be updated by the SN (i.e. by modifying the existing CPC-intra-SN configuration).

2) Once the CPC-intra-SN procedure is executed successfully, the UE releases all CPC-intra-SN configurations stored on the UE side.

3) Upon the successful completion of conventional PSCell change procedure, the UE releases all CPC-intra-SN configurations.

4) The SCG failure information procedure can be used for CPC-intra-SN procedure failure (due to RLF, T304-like timer expiry or compliance check failure).

5) FFS: In case of SRB3, the MN is not informed of CPC-intra-SN execution by the UE.

6) If SRB3 is not configured, the UE first informs the MN that the message has been received. Then the UE needs to provide the CPC complete message to the SN via the MN upon CPC execution.

7) CPC reuses the IE defined for CHO. The field name of the IE could be changed to reflect that the IE is used for both CHO and CPC.

S1_1: While executing CPC procedure, the UE continues to receive RRC reconfiguration from the MN. However, the UE should finalise the ongoing CPC execution before processing the RRC message received from the MN (same as in the conventional PSCell change). i.e. legacy behaviour and no specific UE requirement.

S1_2: As in legacy PSCell change, the UE sends RRCReconfigurationComplete to the MN at execution of CPC when no SRB3 is configured and the MN informs the SN. i.e. the complete message to MN includes an embedded complete message to the SN.

S1_3: The UE sends RRCReconfigurationComplete to the MN at configuration of CPC when no SRB3 is configured and the MN informs the SN. i.e. the complete message to the MN includes an embedded complete message to the SN.

S1_4. Upon RLF on PCell during the execution of Conditional PSCell change for intra-SN change without MN involvement, the UE supports the Rel-16 MR-DC procedures, i.e. performs connection re-establishment procedure without any fast MCG link recovery.

S1_5: Support of CHO and CPC-intra-SN configuration simultaneously is not considered in Rel-16. Leave it up to the network solution to ensure there is no simultaneous CHO and CPC configuration.

S2_6: Reconfirm the use of SCG failure information upon declaring SCG failure in the procedure of the conditional PSCell change.

S2_7. When the conditional PSCell configuration received over SRB3 is invalid, UE initiates SCG failure information procedure to report to the MN about the SN change failure due to invalid configuration (legacy procedure).

S2_9. Like CHO, UE shall follow the below procedures for handling the T310 and T304 timers during conditional PSCell addition/change procedure for EN-DC, NGEN-DC, NR-DC cases:

UE shall not stop MN T310 or SN T310 and shall not start T304 when it receives configuration of a CPC-intra-SN The timer T310 (SN only in case of SN Change) is stopped and timer T304-like is started when the UE begins execution of a CPC-intra-SN.

S3_11. UE checks the validity of conditional PSCell change execution criteria configuration immediately on receiving the conditional PSCell change RRC Reconfiguration message, either embedded in the MN RRC message over SRB1 or received over SRB3 (same as CHO).

S3_12. Introduce no specification changes regarding compliance checking of embedded Reconfiguration message containing configuration of conditional PSCell candidate (same as for CHO).

S2_8 UE performs connection re-establishment procedure or actions upon going to RRC_IDLE (legacy procedure) when the conditional PSCell configuration received over SRB1 is invalid, i.e. UE cannot comply with the embedded PSCell configuration for intra-SN Change Agreements (RAN2 #109bis-e)

1 The UE does not inform the MN when CPC execution condition is fulfilled and the UE starts executing CPC, when CPC configuration is provided over SRB3.

2 A threshold parameter is not introduced to determine PCell quality for execution of CPC.

3 Upon transmission of SCG failure information to the network, the UE stops evaluating the CPC execution criteria according to the current CPC configuration until a response is received from the network.

4 Whether the UE continue measurements for candidate PSCells configured for execution condition upon CPC failure is left to the UE implementation.

5 The content of FailureReportSCG for CPC procedure failure should include failureType, measResultFreqList and measuResultSCG-Failure. These parameters are set according to the exiting SCGFailureInformation procedure. (Same as legacy)

7 Use ULInformationTransferMRDC instead of RRCReconfigurationComplete message to inform the network of CPC execution when no SRB3 is configured and the MN informs the SN, i.e. ULInformationTransferMRDC message to MN includes an embedded RRCReconfigurationComplete message to the SN. This applies to both NR MN and LTE MN. (Change of previous agreement).

Agreements

1 If CPC configuration is not released by network, the UE autonomously releases the stored CPC configuration upon the SCG release.

2 measID and reportConfig associated with CPC config, and measObject(s) only associated to CPC shall be autonomously removed by UE when SCG is released.

4 Support of CPC configuration (CPC condition+CPC reconfiguration) in legacy HO command or CPC configuration in CPC configuration should not be considered in Rel-16.

***End of 3GPP Agreements***

SUMMARY

Systems and methods are disclosed herein for cancellation of Conditional Primary Secondary Cell (PSCell) Addition (CPA) in a cellular communications network. In one embodiment, a method performed by a secondary node comprises receiving a request from a master node for a conditional secondary node addition, the request comprising information that indicates a request for CPA for one or more PSCells. The method further comprises transmitting, to the master node, a response to the request that confirms that a User Equipment (UE) may be accepted for CPA for the one or more PSCells unless a canceling indication is later received and sending, to the master node, a message that indicates that the CPA is cancelled for at least one of the one or more PSCells. In this manner, the secondary node to cancel an already prepared CPA.

In one embodiment, sending the message that indicates that the CPA is cancelled for at least one of the one or more PSCells is triggered by the secondary node upon detection of an overload condition.

In one embodiment, sending the message that indicates that the CPA is cancelled for at least one of the one or more PSCells is triggered by the secondary node upon detection of a need to utilize resources allocated for CPA.

In one embodiment, sending the message that indicates that the CPA is cancelled for at least one of the one or more PSCells is triggered by the secondary node upon expiration of a resource reservation timer managed by the secondary node.

In one embodiment, the message that indicates that the CPA is cancelled for at least one of the one or more PSCells is an S-NODE RELEASE REQUIRED message comprising a list of the one or more PSCells for which the CPA is cancelled.

In one embodiment, the message that indicates that the CPA is cancelled for at least one of the one or more PSCells is a CHO CANCEL message comprising a list of the one or more PSCells for which the CPA is cancelled.

In one embodiment, the message that indicates that the CPA is cancelled for at least one of the one or more PSCells is a new message comprising a list of the one or more PSCells for which the CPA is cancelled.

Embodiments of a secondary node are also disclosed herein. In one embodiment, a first network node is adapted to receive a request from a master node for a conditional secondary node addition, the request comprising information that indicates a request for CPA for one or more PSCells. The first network node is further adapted to transmit, to the master node, a response to the request that confirms that a UE may be accepted for CPA for the one or more PSCells unless a canceling indication is later received and send, to the master node, a message that indicates that the CPA is cancelled for at least one of the one or more PSCells.

In one embodiment, a network node for implementing a secondary node comprises processing circuitry configured to cause the network node to receive a request from a master node for a conditional secondary node addition, the request comprising information that indicates a request for a CPA for one or more PSCells. The processing circuitry is further configured to cause the network node to transmit, to the master node, a response to the request that confirms that a UE may be accepted for CPA for the one or more PSCells unless a canceling indication is later received and send, to the master node, a message that indicates that the CPA is cancelled for at least one of the one or more PSCells.

Embodiment of a method performed by a master node are also disclosed. In one embodiment, a method performed by a master node comprises receiving, from a secondary node, a message that indicates that CPA is cancelled for at least one of one or more PSCells for which CPA was previously requested and sending, to a UE, a Radio Resource Control (RRC) reconfiguration message that removes CPA related configurations for the at least one of the one or more PSCells for which CPA is cancelled.

In one embodiment, the message that indicates that CPA is cancelled for the at least one of the one or more PSCells is an S-NODE RELEASE REQUIRED message, and the S-NODE RELEASE REQUIRED message comprises a list of the at least one of the one or more PSCells for which CPA is cancelled.

In one embodiment, the message that indicates that CPA is cancelled for the at least one of the one or more PSCells is an S-NODE RELEASE REQUIRED message, and the S-NODE RELEASE REQUIRED message comprises a conditional reconfiguration ID(s) for the at least one of the one or more PSCells for which CPA is cancelled.

In one embodiment, the message that indicates that the CPA is cancelled for at least one of the one or more PSCells is a CHO CANCEL message comprising a list of the one or more PSCells for which the CPA is cancelled.

In one embodiment, the message that indicates that the CPA is cancelled for at least one of the one or more PSCells is a new message comprising a list of the one or more PSCells for which the CPA is cancelled.

In one embodiment, an original RRC message sent to the UE to configure the UE for CPA for the one or more PSCells was generated by the master node, and the method further comprises generating the RRC reconfiguration message that removes the CPA related configurations for the at least one of the one or more PSCells for which CPA is cancelled.

Corresponding embodiments of a master node are also disclosed. In one embodiment, a master node is adapted to receive, from a secondary node, a message that indicates that CPA is cancelled for at least one of one or more PSCells for which CPA was previously requested and send, to a UE, a RRC reconfiguration message that removes CPA related configurations for the at least one of the one or more PSCells for which CPA is cancelled.

In one embodiment, a network node for implementing a master node comprises processing circuitry configured to cause the network node to receive, from a secondary node, a message that indicates that CPA is cancelled for at least one of one or more PSCells for which CPA was previously requested and send, to a UE, a RRC reconfiguration message that removes CPA related configurations for the at least one of the one or more PSCells for which CPA is cancelled.

In one embodiment, a method performed by a master node comprises sending a request to a secondary node for a conditional secondary node addition, the request comprising information that indicates a request for CPA for one or more PSCells. The method further comprises receiving, from the secondary node, a response to the request that confirms that a UE may be accepted for CPA for CPA for the one or more PSCells unless a cancelling indication is later received and sending, to the secondary node, a message that indicates that the CPA is cancelled for at least one of the one or more PSCells.

In one embodiment, the method further comprises sending, to a UE for which the CPA was configured, a RRC reconfiguration message that removes CPA related configurations for the at least one of the one or more PSCells for which CPA is cancelled. In one embodiment, an original RRC message sent to the UE to configure the UE for CPA for the one or more PSCells was generated by the master node, and the method further comprises generating the RRC reconfiguration message that removes the CPA related configurations for the at least one of the one or more PSCells for which CPA is cancelled.

In one embodiment, the message that indicates that the CPA is cancelled for at least one of the one or more PSCells is an S-NODE RELEASE REQUEST message comprising a list of the one or more PSCells for which the CPA is cancelled.

In one embodiment, the message that indicates that the CPA is cancelled for at least one of the one or more PSCells is a S-NODE MODIFICATION REQUEST message comprising a list of the one or more PSCells for which the CPA is cancelled.

In one embodiment, the message that indicates that the CPA is cancelled for at least one of the one or more PSCells is a new message comprising a list of the one or more PSCells for which the CPA is cancelled.

Corresponding embodiments of a master node are also disclosed. In one embodiment, a master node is adapted to send a request to a secondary node for a conditional secondary node addition, the request comprising information that indicates a request for CPA for one or more PSCells. The master node is further adapted to receive, from the secondary node, a response to the request that confirms that a UE may be accepted for CPA for CPA for the one or more PSCells unless a cancelling indication is later received and send, to the secondary node, a message that indicates that the CPA is cancelled for at least one of the one or more PSCells.

In one embodiment, a network node for implementing a master node comprises processing circuitry configured to cause the network node to send a request to a secondary node for a conditional secondary node addition, the request comprising information that indicates a request for CPA for one or more PSCells. The processing circuitry is further configured to cause the network node to receive, from the secondary node, a response to the request that confirms that a UE may be accepted for CPA for CPA for the one or more PSCells unless a cancelling indication is later received and send, to the secondary node, a message that indicates that the CPA is cancelled for at least one of the one or more PSCells.

In one embodiment, a method performed by a secondary node comprises receiving, from a master node, a message that indicates that CPA is cancelled for at least one of one or more PSCells for which CPA was previously requested and sending an acknowledgement of cancellation of CPA for the at least one of the one or more PSCells. In one embodiment, the message that indicates that the CPA is cancelled for at least one of the one or more PSCells is an S-NODE RELEASE REQUEST message comprising a list of the one or more PSCells for which the CPA is cancelled. In another embodiment, the message that indicates that the CPA is cancelled for at least one of the one or more PSCells is a S-NODE MODIFICATION REQUEST message comprising a list of the one or more PSCells for which the CPA is cancelled. In another embodiment, the message that indicates that the CPA is cancelled for at least one of the one or more PSCells is a new message comprising a list of the one or more PSCells for which the CPA is cancelled.

Corresponding embodiments of a secondary node are also disclosed. In one embodiment, a secondary node is adapted to receive, from a master node, a message that indicates that CPA is cancelled for at least one of one or more PSCells for which CPA was previously requested and send an acknowledgement of cancellation of CPA for the at least one of the one or more PSCells.

In one embodiment, a network node for implementing a secondary node comprises processing circuitry configured to cause the network node to receive, from a master node, a message that indicates that CPA is cancelled for at least one of one or more PSCells for which CPA was previously requested and send an acknowledgement of cancellation of CPA for the at least one of the one or more PSCells.

Embodiments of a method performed by a UE are also disclosed herein. In one embodiment, a method performed by a UE comprises receiving a RRC Reconfiguration message from a master node, the RRC Reconfiguration message comprising an indication for removing, releasing, or deleting one or more measurement objects and/or one or more report configurations associated to one or more PSCells for which CPA was previously configured, and removing, releasing, or deleting the one or more measurement objects and/or the one or more report configurations associated to one or more PSCells for which CPA, was previously configured, responsive to receiving the RRC Reconfiguration message.

In one embodiment, the indication is comprised within a ConditionalReconfiguration within the received RRC Reconfiguration message.

In one embodiment, the indication is comprised within a ConditionalReconfiguration within a Secondary Cell Group, SCG, RRC Reconfiguration included within the received RRC Reconfiguration message.

Corresponding embodiments of a UE are also disclosed. In one embodiment, a UE is adapted to receive a RRC Reconfiguration message from a master node, the RRC Reconfiguration message comprising an indication for removing, releasing, or deleting one or more measurement objects and/or one or more report configurations associated to one or more PSCells for which CPA was previously configured, and removing, releasing, or deleting the one or more measurement objects and/or the one or more report configurations associated to one or more PSCells for which CPA, was previously configured, responsive to receiving the RRC Reconfiguration message.

In one embodiment, a UE comprises processing circuitry configured to cause the UE to receive a RRC Reconfiguration message from a master node, the RRC Reconfiguration message comprising an indication for removing, releasing, or deleting one or more measurement objects and/or one or more report configurations associated to one or more PSCells for which CPA was previously configured, and removing, releasing, or deleting the one or more measurement objects and/or the one or more report configurations associated to one or more PSCells for which CPA, was previously configured, responsive to receiving the RRC Reconfiguration message.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
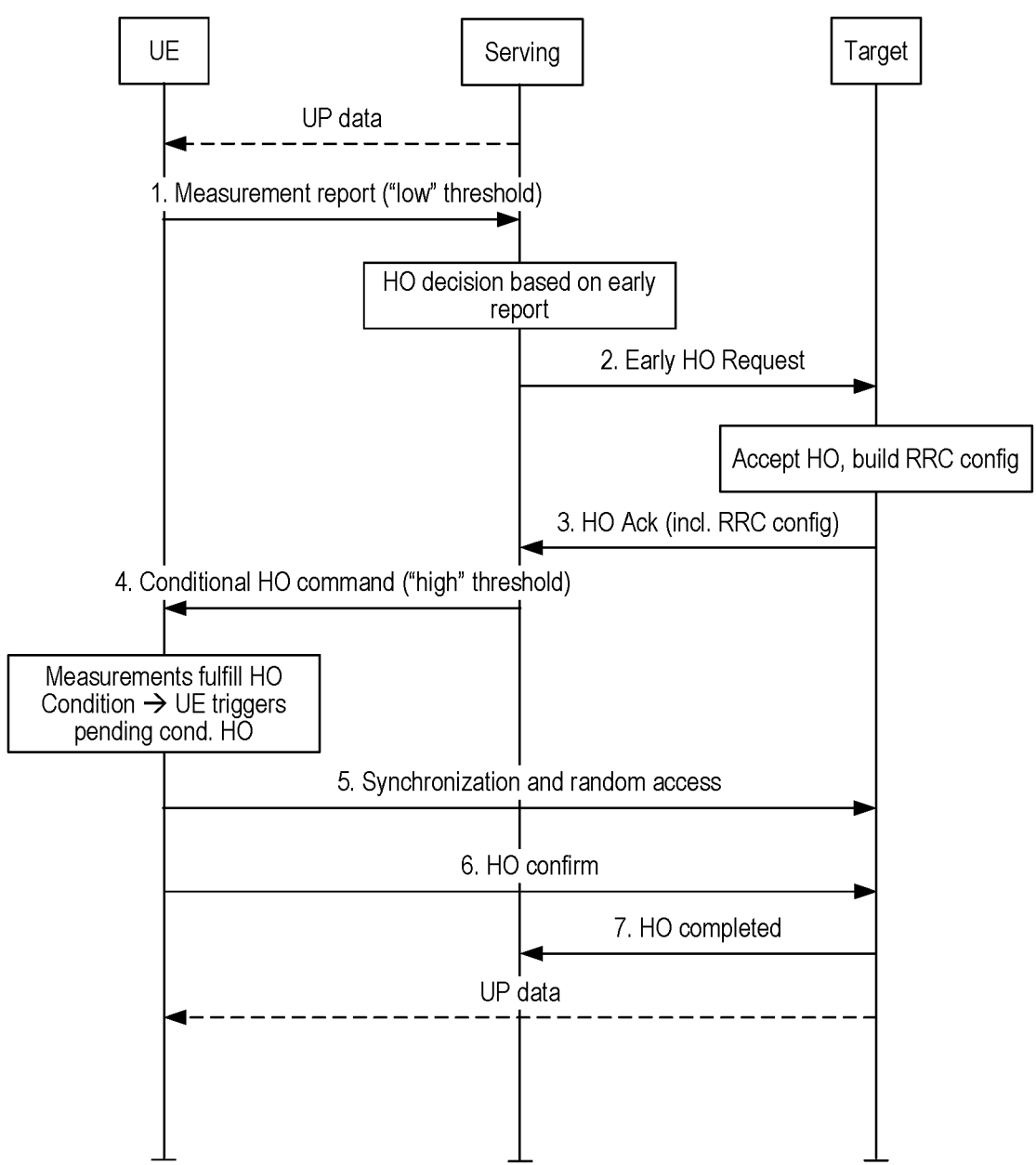
FIG. 1 depicts an example of Conditional Handover (CHO) execution with just a serving cell and a target cell.
Figure 2A:
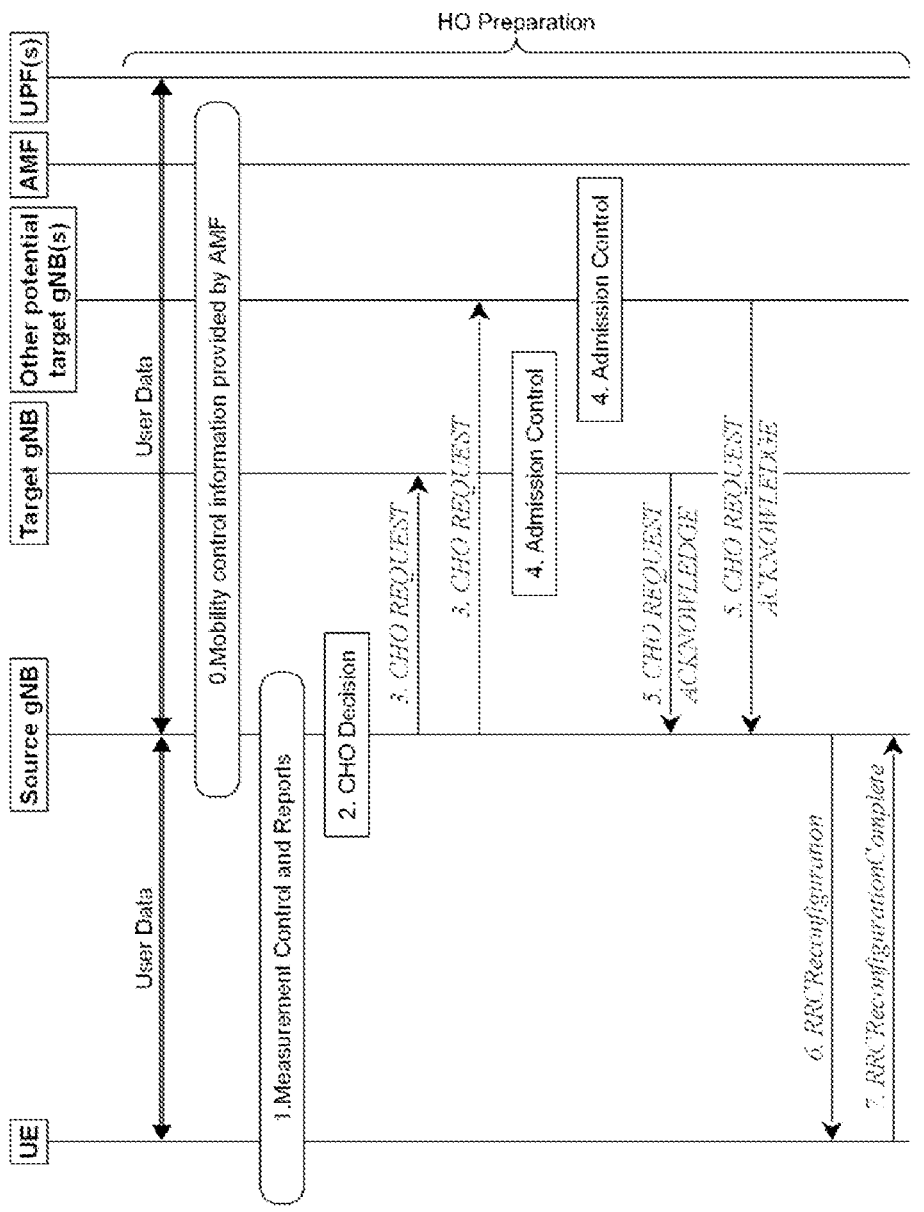
FIGS. 2A and 2B are a reproduction of Figure 9.2.3.4.2-1 of Third Generation Partnership Project (3GPP) Technical Specification (TS) 38.300.
Figure 2B:
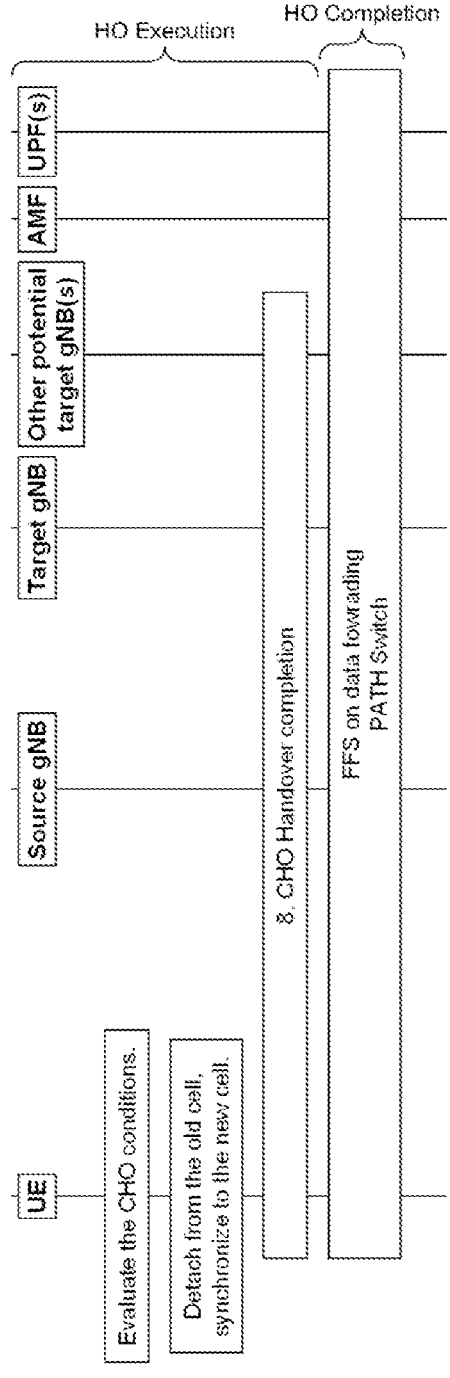
Figure 3:
FIG. 3 is a reproduction of Figure 8.2.9.2-1 of 3GPP TS 38.423.
Figure 4:
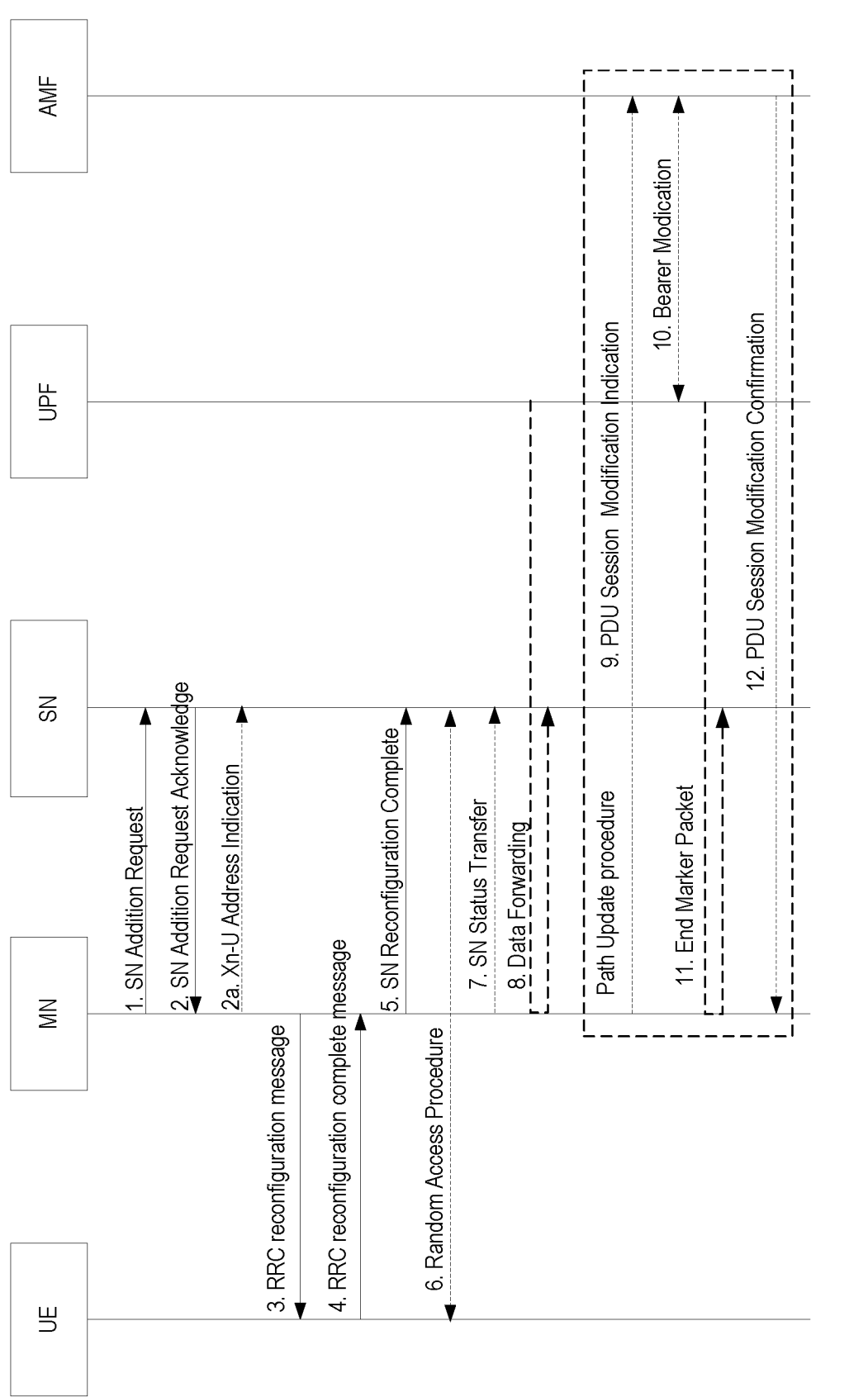
FIG. 4 is a reproduction of Figure 10.2.2-1 of 3GPP TS 37.340.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

The disclosure refers to a first network node operating as a Master Node (MN), e.g., having a Master Cell Group (MCG) configured to the UE and/or an MN-terminated bearer; that MN can be a gNodeB, or a Central Unit gNodeB (CU-gNB) or an eNodeB, or a Central Unit eNodeB (CU-gNB), or any network node and/or network function. The disclosure also refers to a second network node operating as a Secondary Node (SN), or Source Secondary Node (S-SN) e.g. having a Secondary Cell Group (SCG) pre-configured (i.e., not connected to) to the UE; that SN can be a gNodeB, or a Central Unit gNodeB (CU-gNB) or an eNodeB, or a Central Unit eNodeB (CU-gNB), or any network node and/or network function. Notice that MN, S-SN and T-SN may be from the same or different Radio Access Technologies (and possibly be associated to different Core Network nodes).

The disclosure often refers to a "Secondary Node (SN)," or target SN. This is equivalent to saying this is a target candidate SN, or a network node associated to a target candidate PSCell that is being configured.

The disclosure often refers to a "Master Node (MN)." This is equivalent to saying this is a MN to be, or a network tion) procedures. The disclosure refers to a Conditional SN Addition most of the time to refer to the procedure from the UE perspective, to refer to procedures between network nodes wherein a node requests a target candidate SN to configure a conditional PSCell Addition (CPA) for at least one of its associated cells (cell associated to the target candidate SN).

The configuration of CPA can be done using the same IEs as conditional handover, which may be called at some point conditional configuration or conditional reconfiguration. The principle for the configuration is the same with configuring triggering/execution condition(s) and a reconfiguration message to be applied when the triggering condition(s) are fulfilled. The configuration IEs from TS 38.331:

***Start of Text from 3GPP TS 38.331***

ConditionalReconfiguration

The IE ConditionalReconfiguration is used to add, modify and release the configuration of conditional configuration.

ConditionalReconfiguration Information Element

```
-- ASN1START
-- TAG-CONDITIONALRECONFIGURATION-START
ConditionalReconfiguration-r16 ::=        SEQUENCE {
    attemptCcondReconfig-r16          ENUMERATED {true}        OPTIONAL, -- Need N
    condConfigToRemoveList-r16        CondConfigToRemoveList-r16    OPTIONAL, -- Need N
    condConfigToAddModList-r16        CondConfigToAddModList-r16    OPTIONAL, -- Need N
    ...
}
CondConfigToRemoveList-r16 ::=    SEQUENCE (SIZE (1.. maxNrofCondCells)) OF CondConfigId-
r16
-- TAG-CONDITIONALRECONFIGURATION-STOP
-- ASN1STOP
``` node that has configured a UE connected to it with CPA. The term "to be" refers to the fact that when CPA is prepared the UE is not yet operating in MR-DC, so strictly speaking one might say this is not yet operating as a MN in the same ways as in legacy MR-DC, since the UE is still in single connectivity until it executes CPA.

"MN generated CPA" corresponds to a procedure wherein the node connected to the UE in single connectivity (to become a Master Node—MN upon CPA execution) determines to configure conditional PSCell Addition (CPA).

The disclosure refers to a candidate SN, or SN candidate, or an SN, as the network node (e.g., gNodeB) that is prepared during the CPA procedure and that can create an RRC Reconfiguration message with an SCG configuration (e.g., RRCReconfiguration**) to be provided to the UE and stored, with an execution condition, wherein the UE only applies the message upon the fulfillment of the execution condition. That candidate SN is associated to one or multiple PSCell candidate cell(s) that the UE can be configured with. The UE then can execute the condition and accesses one of these candidate cells, associated to a candidate SN that becomes the SN or simply the SN after execution (i.e., upon fulfillment of the execution condition).

The disclosure refers to a Conditional PSCell Addition (CPA) configuration and procedures (like CPA execution), most of the time to refer to the procedure from the UE perspective. Other terms may be considered as synonyms such as conditional reconfiguration, or Conditional Configuration (since the message that is stored and applied upon fulfillment of a condition is an RRCReconfiguration or RRCConnectionReconfiguration). Terminology wise, one could also interpret conditional handover (CHO) in a broader sense, also covering CPA (Conditional PSCell Addi-

---

ConditionalReconfiguration field descriptions condConfigToAddModList

List of the configuration of candidate SpCells to be added or modified for CHO or CPC.

condConfigToRemoveList

List of the configuration of candidate SpCells to be removed. When the network removes the stored conditional configuration for a candidate cell, the network releases the measIDs associated to the condExecutionCond if it is not used by the condExecutionCond of other candidate cells.

---

CondConfigId

The IE CondConfigId is used to identify a CHO or CPC configuration.

CondConfigId Information Element

```
-- ASN1START
-- TAG-CONDCONFIGID-START
CondConfigId-r16 ::=        INTEGER (1.. maxNrofCond-Cells)
-- TAG-CONDCONFIGID-STOP
-- ASN1STOP
```

CondConfigToAddModList

The IE CHO-ConfigToAddModList concerns a list of conditional configurations to add or modify, with for each entry the cho-ConfigId and the associated condExecutionCond and condRRCReconfig.

CondConfigToAddModList Information Element

```
-- ASN1START
-- TAG-CONDCONFIGTOADDMODLIST-START
CondConfigToAddModList-r16 ::=        SEQUENCE (SIZE (1.. maxNrofCondCells)) OF
CondConfigToAddMod-r16
CondConfigToAddMod-r16 ::=        SEQUENCE {
    condConfigId-r16                    CondConfigId-r16,
    condExecutionCond-r16                SEQUENCE (SIZE (1..2)) OF MeasId OPTIONAL,
Need S
    condRRCReconfig-r16                  OCTET STRING (CONTAINING RRCReconfiguration)
OPTIONAL, -- Need S
    ...
}
-- TAG-CONDCONFIGTOADDMODLIST-STOP
-- ASN1STOP
```

| CondConfigToAddMod field descriptions |
| --- |
| condExecutionCond |
| The execution condition that needs to be fulfilled in order to trigger the execution of a conditional configuration. The field is mandatory present when a condConfigId is being added. Otherwise, when the condRRCReconfig associated to a condConfigId is being modified it is optionally present and the UE uses the stored value if the field is absent. |
| condRRCReconfig |
| The RRCReconfiguration message to be applied when the condition(s) are fulfilled. The field is mandatory present when a condConfigId is being added. Otherwise, when the condExecutionCond associated to a condConfigId is being modified it is optionally present and the UE uses the stored value if the field is absent. |

***End of Text from 3GPP TS 38.331***

Before providing a detailed description of embodiments of the present disclosure a brief discussion of problems associated with existing solutions is beneficial. One problem that the disclosure addresses relates to a new scenario to be supported in Third Generation Partnership Project (3GPP) Rel-17 which is when the User Equipment (UE) is not operating in Multi-Radio Dual Connectivity (MR-DC), i.e., the UE has a connection with only one node (e.g. a Next Generation Radio Access Network (NG-RAN) gNodeB), and is configured with one or multiple Secondary Node (SN) Addition configurations (i.e., one or multiple RRCRecon-figuration messages for one or multiple Primary Secondary Cells (PSCells)), wherein one of the messages is to be applied upon the fulfillment of a condition e.g. like an A4 event (when measurement quantity like Reference Signal Received Power (RSRP) and/or Reference Signal Received Quality (RSRQ) for a neighbor cell in an indicated fre-quency becomes better than a defined threshold per mea-surement quantity). In existing solutions, there is no possi-bility for the candidate SN to cancel one or multiple candidate PSCells for Conditional PSCell Addition (CPA).

In the legacy PSCell addition procedure, the inter-node messages between Master Node (MN) and SN are X2AP/XnAP messages, as described in the Background section above. One problem of the existing solution is that, in CPA, the MN requests the SN (or SN to be) to prepare a CPA message. Then, when the SN prepares that message, the SN needs to reserve a certain amount of resources such as Cell Radio Network Temporary Identifier (C-RNTI), Random Access Channel (RACH) (in case of contention free RACH is configured), transmission power, and bandwidth, and make sure the services/bearers the UE is running are sup-ported in the target PSCell with a minimum Quality of Service (QoS), etc.

One problem is that, time-wise, the SN does not really know when the UE is fulfilling the condition that will trigger the SN addition. In addition to that, it is not even certain that the UE is going to a specific SN, as CPA may support the configuration of multiple candidate PSCells possibly from multiple SNs. Further, as the load and overall conditions in a mobile network are quite volatile, the load and overall conditions may be very different at the time a given node that is a potential SN for CPA accepts a request from a MN and the time the UE performs the access. Similarly, the MN may decide that it does not want to configure the UE with MR-DC any longer, e.g., due to changes in traffic demands Such a problem is specific for CPA and does not exist in conventional SN addition. The reason is that, in legacy systems when a PSCell is prepared, the UE is expected to access the PScell within a short time whereas, in CPA, as explained above, the UE may access the PSCell some time later or not at all.

Certain aspects of the present disclosure and their embodiments may provide solutions to these or other chal-lenges. Methods are described herein for the cancellation of one or multiple candidate cells (sometimes called target candidate cells) belonging to (or associated to) a candidate SN, after a successful SN Addition preparation. These methods comprise methods on network nodes and on a wireless terminal (also called a User Equipment—UE) capable of operating in MR-DC. The methods cover at least one the following cases: SN-initiated cancelling of CPA towards a MN (target-initiated cancelling) and MN-initiated cancelling of CPA towards a target candidate SN (source-initiated cancelling).

In regard to SN-initiated cancelling of CPA towards a MN (target-initiated cancelling) embodiments, according to one embodiment, a method is performed by a SN. The method includes receiving a request from a MN to prepare a con-ditional SN addition (i.e., prepare CPA for a UE connected to the MN), transmitting to the MN a response to the conditional SN addition request confirming that a UE may be accepted (unless a canceling message is later received), sending a cancelling indication to the MN indicating that a previously provided conditional SN addition configuration is not valid, and, upon sending the cancelling indication, performing actions such as releasing of resources associated to the CPA that has been indicated to be cancelled, stopping supervision timer, etc.

According to another embodiment, a method is performed by a MN. The method comprises transmitting a conditional SN addition request to a target SN (target candidate), receiv-ing a response to the conditional SN addition request, confirming that a UE may be accepted (unless a canceling message is later received), receiving a cancelling indication from a target SN indicating that a previously provided conditional SN addition configuration is not valid, and, upon receiving the cancelling indication, performing actions such as releasing of resources associated to the CPA that has been indicated to be cancelled, stopping supervision timer, etc. The method may also include re-configuring a UE to cancel (e.g., by including, in a condConfigToRemoveList, the associated CPA that has been canceled) or updating a conditional PSCell addition associated to the SN that has sent the cancelling indication.

In regard to MN-initiated cancelling of CPA towards an SN (source-initiated cancelling) embodiments, according to one embodiment, a method is executed by a MN. The method comprises transmitting a conditional SN addition request to a target SN, receiving a response to the conditional SN addition request, confirming that a UE may be accepted unless a canceling message is later received, sending a cancelling indication from a target SN indicating that a previously provided conditional SN addition configuration is not valid, and re-configuring a UE to cancel or update a conditional PSCell addition associated to the MN.

According to another embodiment, a method for an MN generated CPA and MN initiated cancellation executed by a SN comprises receiving a request from a MN to prepare a conditional SN addition (e.g., resulting in a CPA), transmitting to the MN a response to the conditional SN addition request confirming that a UE may be accepted unless a canceling message is later received, and receiving a cancelling indication indicating that a previously provided conditional SN addition configuration is not valid.

According to yet another embodiment, a method executed by a UE comprises receiving a RRCReconfiguration message from a MN and deleting the configuration for one or multiple conditional candidate PSCells.

Certain embodiments may provide one or more of the following technical advantages. Certain embodiments make it possible for a target candidate SN to cancel an already prepared Conditional SN Addition. In case of a change in available resources in one or multiple candidate cells belonging to the candidate SN, one or multiple cells (or all) to free resources for non-conditional HO or SN addition. Certain embodiments make it possible for a source node (to become MN when/if CPA is executed) to cancel an already prepared Conditional SN Addition towards an SN target candidate, e.g., in case the source wants to release a UE, or in case the UE has executed CPA in another target candidate.

Now, the description turns to details of various embodiments of the present disclosure. The following detailed discussion provides solutions for two different assumptions: (1) MN generates CPA configuration ("Secondary Node Method"), and (2) SN generates CPA configuration ("Master Node Method"). The detailed discussion below is divided into six primary sections, as briefly described below.

Section 1 below address an embodiment in which the MN generates the Radio Resource Control (RRC) message, e.g., RRCReconfiguration, containing the condition(s) which the UE should monitor and also generates the message to be applied when the condition(s) are fulfilled (i.e., the message applied by the UE upon execution is in MN-format and may contain MN/MCG related configurations). According to the method, after CPA has been configured, the target SN decides to cancel the CPA, see FIG. 5.

Section 2 below addresses an embodiment in which the MN generates the RRC message, e.g., RRCReconfiguration, containing the condition(s) which the UE should monitor and the message to be applied when the condition(s) are fulfilled. After CPA has been configured, the MN determines to cancel the CPA. See FIG. 9.

Section 3 addresses an embodiment in which the SN generates the RRC message, e.g., RRCReconfiguration, containing the condition(s) which the UE should monitor and the message to be applied when the condition(s) are fulfilled. However, after CPA has been configured, the SN decides to cancel the CPA, see FIG. 10.

Section 4 addresses an embodiment in which the RRC message, e.g. RRCReconfiguration, containing the condition(s) which the UE should monitor and the message to be applied when the condition(s) are fulfilled. However, after CPA has been configured, the MN decides to cancel the CPA, see FIG. 11.

Section 5 addresses UE actions.

Section 6 describes example embodiments of systems and nodes in which embodiments of the present disclosure may be implemented.

1 MN Generates CPA Configuration (Method Executed by Secondary Node)

In this option, the MN generates the RRC message, e.g., RRCReconfiguration, containing the condition(s) which the UE should monitor and also generates the message to be applied when the condition(s) are fulfilled (i.e., the message applied by the UE upon execution is in MN-format and may contain MN/MCG related configurations). According to the method, after CPA has been configured, the target SN decides to cancel the CPA, see FIG. 5.

Figure 5:
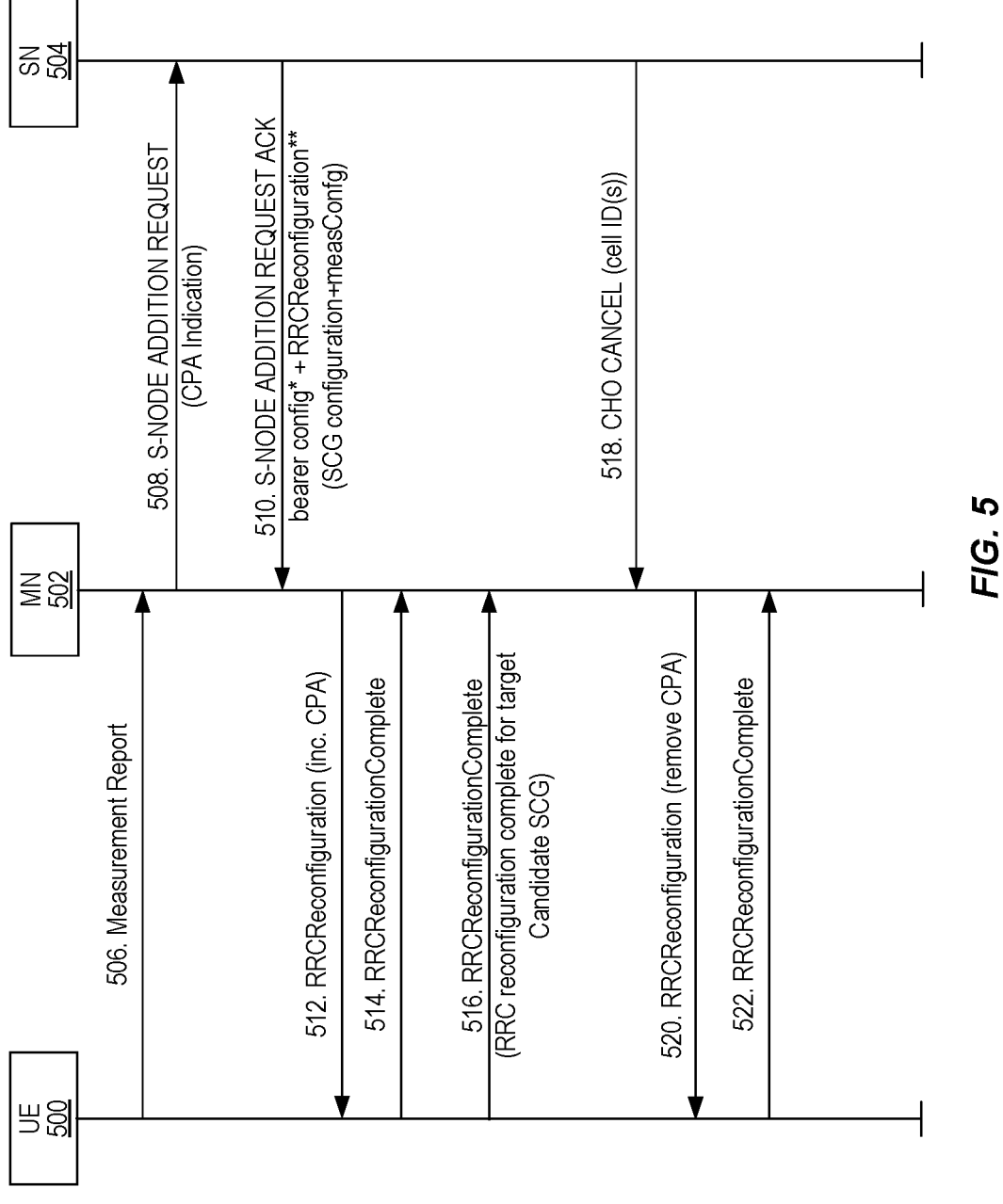
FIG. 5 illustrates the operation of a User Equipment (UE), a Master Node (MN), and a Secondary Node (SN) for SN-initiated cancellation of CPA with MN-generated Conditional Primary Secondary Cell (PSCell) Addition (CPA) in accordance with one embodiment of the present disclosure.

In this regard, FIG. 5 illustrates the operation of a UE 500, a MN 502, and a SN 504 for SN-initiated cancellation of CPA with MN-generated CPA in accordance with one embodiment of the present disclosure. As illustrated, the UE 500 sends a measurement report to the MN 502 (step 506). Based on the measurement report, the MN 502 sends a SN Addition Request to the SN 504 (step 508). The SN Addition Request comprises a CPA indication. The SN 504 returns a SN Addition Request ACK to the MN 502 (step 510). The MN 502 sends an RRCReconfiguration including CPA to the UE 500 (step 512). The RRCReconfiguration, contains the condition(s) which the UE 500 should monitor and the message to be applied when the condition(s) are fulfilled. The UE 500 responds with an RRCReconfigurationComplete (step 514). The UE 500 also sends an RRCReconfigurationComplete for the target candidate SCG to the MN 502 (step 516). Sometime after receiving SN Addition Request in step 508, the SN 504 sends a CHO Cancel message including one or more cell IDs of the one or more respective PSCells for which CPA is being cancelled (step 518). As discussed below, the CHO Cancel message is only an example. Other types of messages may be used for CPA cancellation. The MN 502 sends an RRCReconfiguration message to the UE 500 that includes information that removes the CPA for the one or more PSCells indicated by the one or more cell IDs in the CHO Cancel message (step 520). The UE 500 returns an RRCReconfigurationComplete to the MN 502 (step 522).

Secondary Node Execution. The present disclosure comprises a method executed by a SN (e.g., SN 504), the method comprising receiving a request from a MN (e.g., MN 502) to prepare a conditional SN addition (i.e., a conditional SN addition request including an indication of a CPA for one or more PSCells) (see, e.g., FIG. 5, step 508), transmitting to the MN a response to the conditional SN addition request confirming that a UE may be accepted unless a canceling message is later received (e.g., FIG. 5, step 510), and sending a cancelling indication indicating that a previously provided conditional SN addition configuration is not valid (e.g., FIG. 5, step 518). Sending of the cancellation indicathe condConfigToRemoveList within an RRC message, e.g. RRCReconfiguration, for the conditional reconfigurations to be removed, as indicated below:

\* \* \* \* \* \* \* \* \* \* \* \* \* \* \* \* \* \* \* \*

```
-- ASN1START
-- TAG-CONDITIONALRECONFIGURATION-START
ConditionalReconfiguration-r16 ::=       SEQUENCE {              OPTIONAL, -- Need N
    attemptCcondReconfig-r16              ENUMERATED {true}
    condConfigToRemoveList-r16           CondConfigToRemoveList-r16    OPTIONAL, -- Need N
    condConfigToAddModList-r16           CondConfigToAddModList-r16    OPTIONAL, -- Need N
    ...
}
CondConfigToRemoveList-r16 ::=       SEQUENCE (SIZE (1.. maxNrofCondCells)) OF CondConfigId-
r16
-- TAG-CONDITIONALRECONFIGURATION-STOP
``` tion may be triggered by the SN upon the detection of an overload condition, the need to utilize the allocated resources for CPA, or upon the expiry of a resource reservation timer managed by the SN.

In a first embodiment, the cancelling indication may be a list of cells (e.g., list of configured candidate PSCells) to be cancelled contained in a S-NODE RELEASE REQUIRED message. That message is to be interpreted by the recipient as the release of a subset of configured candidate PSCells, not the release of all resources of the target candidate SN, except if all configured cells are being canceled, where in this case the SN could omit the list of cells. In this case, different from what is shown in FIG. 5, there may be a response message from the MN to the SN to acknowledge that the MN has received the message and performed the cancelling. In one option, the response message is transmitted after the MN removes the canceled PSCells from the UE's CPA configuration, so that only upon that the SN actually cancels the PScells for CPA, to avoid any type of race conditions (where the UE may try to access a configured PScell that is being canceled before it has received the removal indication from the MN).

In a second embodiment, the cancelling indication can be a list of PSCells to be cancelled contained in a CHO CANCEL message. The recipient interprets that this is not for CHO but for CPA thanks to some specific indication in the message or implicitly by the message content such as the list of cells the MN has previously requested to be configured for CPA and/or a cause value within the CHO CANCEL (e.g., 'cpa-cancel').

In a third embodiment, the cancelling indication can be a list of PSCells to be cancelled contained in a new message, e.g., a CPA CANCEL message.

Master Node Execution. The present disclosure comprises a method executed by a MN (e.g., MN 502) where the method comprises receiving a cancelling indication indicating that a previously provided conditional SN addition configuration is not valid (e.g., step 518). In the first embodiment, where the cancellation indication is included in S-NODE RELEASE REQUIRED message, the target SN (e.g., SN 504) sends the message to the MN. The message may e.g. contain a list of cells for which CPA should be cancelled, or the conditional reconfiguration ID(s) for the cells to be canceled (i.e., removed from the UE's CPA configuration). In the case the MN has generated the original message to the UE (e.g., UE 500) with the CPA configuration, the MN can also build a new reconfiguration message to the UE, where the CPA configuration is removed for the indicated cells. In RRC signaling, this is done by signaling

\* \* \* \* \* \* \* \* \* \* \* \* \* \* \* \* \* \* \* \*

At the UE side, the UE (e.g., UE 500) perform the following actions.

\*\*\*\*\*UE Actions (see 3GPP TS 38.331)\*\*\*\*\*

5.3.5.13 Conditional Reconfiguration 5.3.5.13.1 General

The network configures the UE with one or more candidate target SpCells in the conditional reconfiguration. The UE evaluates the condition of each configured candidate target SpCell. The UE applies the conditional reconfiguration associated with one of the target SpCells which fulfils associated execution condition. The network provides the configuration parameters for the target SpCell in the ConditionalReconfiguration IE.

The UE performs the following actions based on a received ConditionalReconfiguration IE:

1> if the ConditionalReconfiguration contains the condReconfigToRemoveList:

2> perform conditional reconfiguration removal procedure as specified in 5.3.5.13.2;

( . . . )

5.3.5.13.2 Conditional Reconfiguration Removal

The UE shall:

1> for each condReconfigId value included in the condReconfigToRemoveList that is part of the current UE conditional reconfiguration in VarConditionalReconfig:

2> remove the entry with the matching condReconfigId from the VarConditionalReconfig;

NOTE: The UE does not consider the message as erroneous if the condReconfigToRemoveList includes any condReconfigId value that is not part of the current UE configuration.

\*\*\*\*\*End UE Actions\*\*\*\*\*

Upon removing the indicate entry or entries, the UE stops monitoring the CPA associated conditions. Example implementation of this embodiment in 3GPP TS 38.423 is shown below.

\*\*\*\*\*Example Implementation of Embodiment in TS 38.423\*\*\*\*\*

8.3.7 S-NG-RAN Node Initiated S-NG-RAN Node Release 8.3.7.1 General

This procedure is triggered by the S-NG-RAN node to initiate the release of the resources for a specific UE.

The procedure uses UE-associated signalling.

8.3.7.2 Successful Operation

Figure 6:
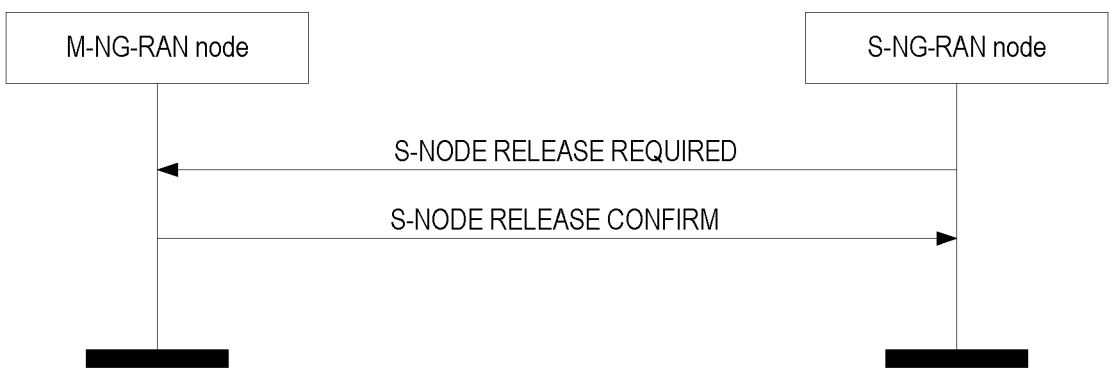
FIG. 6 illustrates Secondary Next Generation Radio Access Network (S-NG-RAN) node initiated S-NG-RAN node release.

[See FIG. 6]

Figure 8:
FIG. 8 illustrates CHO cancellation for CPA.

Figure 8.3.7.2-1: S-NG-RAN Node Initiated S-NG-RAN Node Release, Successful Operation The S-NG-RAN node initiates the procedure by sending the S-NODE RELEASE REQUIRED message to the M-NG-RAN node.

Upon reception of the S-NODE RELEASE REQUIRED message, the M-NG-RAN node replies with the S-NODE RELEASE CONFIRM message.

For each SN-terminated PDU session resource, the M-NG-RAN node may include the DL Forwarding UP Address IE and the UL Forwarding UP Address IE within the PDU Session Resources To Be Released Item IE to indicate that it requests data forwarding of uplink and downlink packets to be performed for that bearer.

The S-NG-RAN node may start data forwarding and stop providing user data to the UE upon reception of the S-NODE RELEASE CONFIRM message, If the S-NG-RAN node to M-NG-RAN node Container IE is included in the S-NODE RELEASE REQUIRED message, the M-NG-RAN node may use the contained information to apply delta configuration.

If the Candidate PSCells To Be Cancelled List is included in the S-NODE RELEASE REQUIRED message, the M-NG-RAN node shall consider that the resources reserved for the cells identified by the included NG-RAN CGI(s) are about to be released.

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
\*\*\*\*\*\*\*\*\*\*\*\*\*\*\*\*\*\*\*\*\*\*\*\*\*\*\*\*\*\*\*

9.1.2.17 S-Node Release Required

This message is sent by the S-NG-RAN node to request the release of all resources for a specific UE at the S-NG-RAN node.

Direction: S-NG-RAN node M-NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| M-NG-RAN node UE XnAP ID | M | | NG-RAN node UE XnAP ID 9.2.3.16 | Allocated at the M-NG-RAN node | YES | reject |
| S-NG-RAN node UE XnAP ID | M | | NG-RAN node UE XnAP ID 9.2.3.16 | Allocated at the S-NG-RAN node | YES | reject |
| PDU sessions To Be Released | | 0..1 | | | YES | ignore |
| >PDU Session Resources to be released List - SN terminated | O | | PDU session List with data forwarding request info 9.2.1.24 | | — | |
| Cause | M | | 9.2.3.2 | | YES | ignore |
| S-NG-RAN node to M-NG-RAN node Container | O | | OCTET STRING | Includes the CG-Config message as defined in TS 38.331 [10]. | YES | ignore |
| Candidate PSCells To Be Cancelled List | | 0 .. <maxnoofCellsinCPA> | | | YES | reject |
| >Target Cell ID | M | | Target Cell Global ID 9.2.3.25 | | — | — |

| Range bound | Explanation |
|---|---|
| maxnoofCellsinCPA | Maximum no. cells that can be prepared for a conditional SN Addition. Value is 8. |

If the S-NODE RELEASE REQUIRED message contains an PDU session resource to be released which is configured with the SCG bearer option within the PDU sessions to be released List—SN terminated IE, the S-NG-RAN node shall include the RLC Mode IE within the DRBs To Be Released List IE in the PDU Session to be released List—SN terminated IE in the S-NODE RELEASE REQUIRED message. The RLC Mode IE indicates the RLC mode used in the S-NG-RAN node for the DRB.

If the S-NODE RELEASE CONFIRM message includes the DRB IDs taken into use IE, the S-NG-RAN node shall, if applicable, act as specified in TS 37.340 [8].

\*\*\*\*\*End Example Implementation of Embodiment in TS 38.423\*\*\*\*\*

In the second embodiment, where the cancellation indication is included in a CHO CANCEL message, the target SN sends the message to the MN. The message may, e.g., contain a list of cells for which CPA should be cancelled or the conditional reconfiguration ID(s). The MN can cancel the CPA configuration to the UE by signaling RRCReconfiguration containing condConfigToRemoveList for the conditional reconfigurations to be removed. As the message was originally designed for CHO, the message from SN to MN may contain additional information to indicate that this is for a prepared CPA procedure e.g. a cause value within the CHO CANCEL (e.g., 'cpa-cancel').

Example implementation of this embodiment in 3GPP TS 38.423 is shown below.

***Example Implementation of Embodiment in TS 38.423***

8.2.9 Conditional Handover Cancel 8.2.9.1 General

The Conditional Handover Cancel procedure is used to enable a target NG-RAN node to cancel an already prepared conditional handover or to enable a S-NG-RAN node to cancel all or parts of an already prepared CPA.

The procedure uses UE-associated signalling.

8.2.9.2 Successful Operation

Figure 7:
FIG. 7 illustrates CHO cancellation.

[See FIG. 7]

Figure 8.2.9.2-1: Conditional Handover Cancel, Successful Operation

[See FIG. 8]

Figure 8.2.9.2-2: Conditional Handover Cancel for CPA, Successful Operation

The target NG-RAN node initiates the procedure by sending the CONDITIONAL HANDOVER CANCEL message to the source NG-RAN node. The target NG-RAN node shall CONDITIONAL HANDOVER CANCEL message, the source NG-RAN node shall consider that only the resources reserved for the cells identified by the included NG-RAN CGI are about to be released.

If the CPA Cancellation Indicator IE is contained in the CONDITIONAL HANDOVER CANCEL message, the M-NG-RAN node shall consider that the procedure is related to a Conditional PSCell Addition, and shall that the S-NG-RAN node is about to remove any reference to, and release any resources previously reserved for candidate cells associated to the UE-associated signalling identified by the M-NG-RAN node UE XnAP ID contained in the Source NG-RAN node UE XnAP ID IE and the S-NG-RAN node UE XnAP ID contained in the Target NG-RAN node UE XnAP ID IE. If the Candidate Cells To Be Cancelled List IE is included in CONDITIONAL HANDOVER CANCEL message, the M-NG-RAN node shall consider that only the resources reserved for the cells identified by the included NG-RAN CGI are about to be released.

*********************************************************************

9.1.1.13 Conditional Handover Cancel

This message is sent by the target NG-RAN node to the source NG-RAN node to cancel an already prepared conditional handover.

Direction: target NG-RAN node→source NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | ignore |
| Source NG-RAN node UE XnAP ID | M | | NG-RAN node UE XnAP ID 9.2.3.16 | Allocated at the source NG-RAN node. | YES | ignore |
| Target NG-RAN node UE XnAP ID | M | | NG-RAN node UE XnAP ID 9.2.3.16 | Allocated at the target NG-RAN node. | YES | reject |
| Cause | M | | 9.2.3.2 | | YES | ignore |
| Candidate Cells To Be Cancelled List | | 0 .. <maxnoofCellsinCHO> | | | YES | reject |
| >Target Cell ID | M | | Target Cell Global ID 9.2.3.25 | | — | — |
| CPA Cancellation Indicator | O | | ENUMERATED (cpa, ...) | Indicates that the message is used to cancel one or multiple PSCells of an already prepared CPAC procedure | YES | ignore | indicate the reason for cancelling the conditional handover by means of an appropriate cause value.

At the reception of the CONDITIONAL HANDOVER CANCEL message, the source NG-RAN node shall consider that the target NG-RAN node is about to remove any reference to, and release any resources previously reserved for candidate cells associated to the UE-associated signalling identified by the Source NG-RAN node UE XnAP ID IE and the Target NG-RAN node UE XnAP ID IE. If the Candidate Cells To Be Cancelled List IE is included in

***End Example Implementation of Embodiment in TS 38.423***

In the third embodiment, where the cancellation indication is included in a new message, e.g., a CPA CANCEL or CPAC CANCEL message, the target SN sends the message to the MN. As in the first embodiment, the message may e.g. contain a list of cells for which CPA should be cancelled or the conditional reconfiguration ID. The MN can cancel the CPA configuration to the UE by signaling RRCReconfiguration containing condConfigToRemoveList for the conditional reconfigurations to be removed.

Example implementation of this embodiment in 3GPP TS 38.423 is shown below.

***Example Implementation of Embodiment in 3GPP TS 38.423***

9.1.1.13 CPA Cancel

This message is sent by the target S-NG-RAN node to the source M-NG-RAN node to cancel one or multiple PSCells of an already prepared conditional SN Addition.

Direction: target S-NG-RAN node source→M-NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | ignore |
| M-NG-RAN node UE XnAP ID | M | | NG-RAN node UE XnAP ID 9.2.3.16 | Allocated at the M-NG-RAN node | YES | reject |
| S-NG-RAN node UE XnAP ID | M | | NG-RAN node UE XnAP ID 9.2.3.16 | Allocated at the S-NG-RAN node | YES | reject |
| Cause | M | | 9.2.3.2 | | YES | ignore |
| Candidate PSCells To Be Cancelled List | | 0 .. <maxnoofCellsinCPA> | | | YES | reject |
| >Target Cell ID | M | | Target Cell Global ID 9.2.3.25 | | — | — |
| S-NG-RAN node to M-NG-RAN node Container | M | | OCTET STRING | Includes the CG-Config message as defined in subclause 11.2.2 of TS 38.331 [10]. | YES | reject |

| Range bound | Explanation |
|---|---|
| maxnoofCellsinCPA | Maximum no. cells that can be prepared for a conditional SN Addition. Value is 8. |

Example of SN-Initiated Cancel of CPA—MN-Generated RRCReconfiguration

***End Example Implementation of Embodiment in TS 38.423***

2 MN Generated Conditional PSCell Addition, MN-Initiated Cancel (Source Initiated)

As in Section 1 of the detailed description above, in this option, the MN generates the RRC message, e.g. RRCReconfiguration, containing the condition(s) which the UE should monitor and the message to be applied when the condition(s) are fulfilled. After CPA has been configured, the MN determines to cancel the CPA, see FIG. 9.

Figure 9:
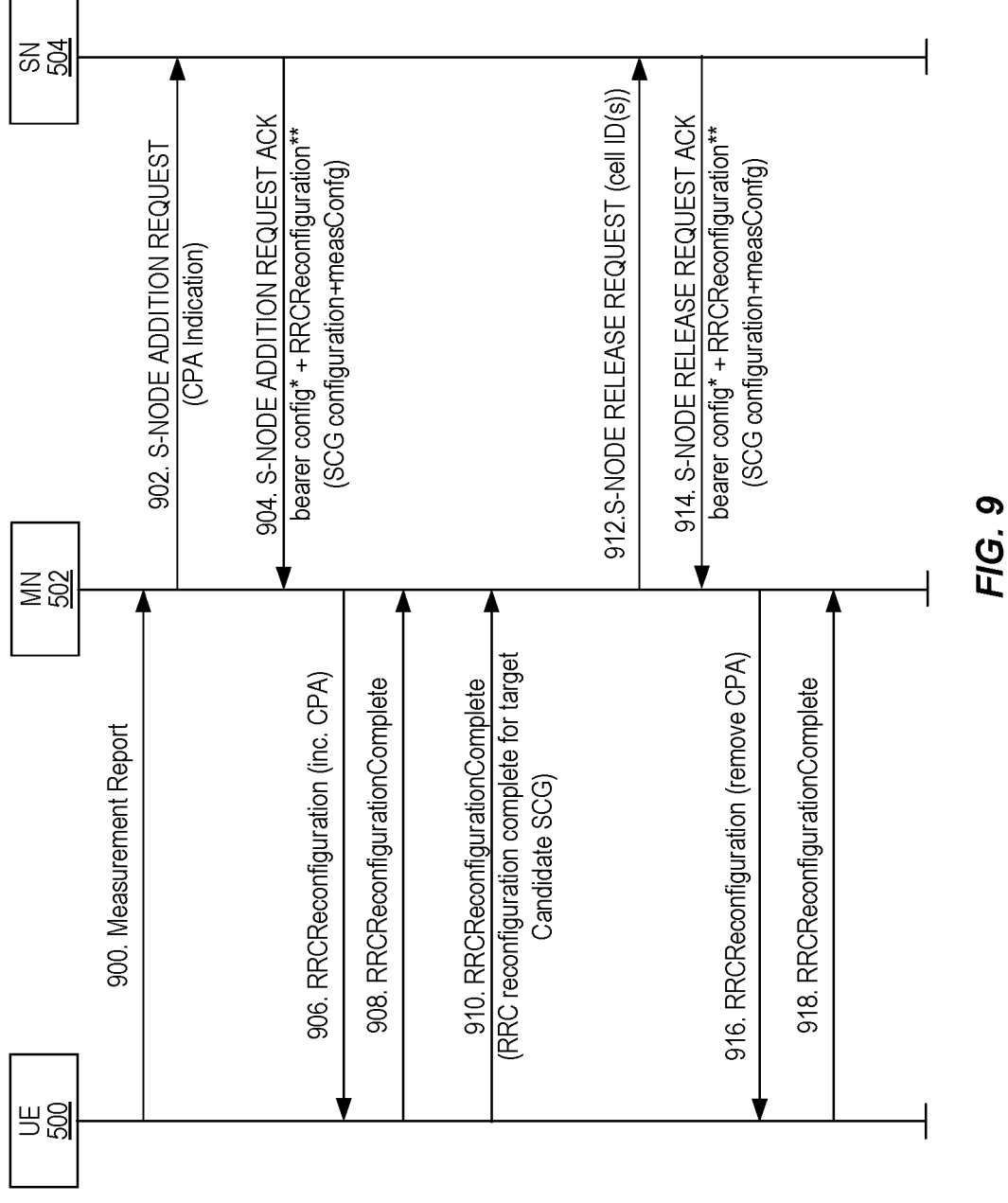
FIG. 9 illustrates the operation of the UE, the MN, and the SN for MN-initiated cancellation of CPA with MN-generated CPA in accordance with another embodiment of the present disclosure.

In this regard, FIG. 9 illustrates the operation of the UE 500, the MN 502, and the SN 504 for MN-initiated cancellation of CPA with MN-generated CPA in accordance with another embodiment of the present disclosure. As illustrated, the UE 500 sends a measurement report to the MN 502 (step 900). Based on the measurement report, the MN 502 sends a SN Addition Request to the SN 504 (step 902). The SN Addition Request comprises a CPA indication. The SN 504 returns a SN Addition Request ACK to the MN 502 (step 904). The MN 502 sends an RRCReconfiguration including CPA to the UE 500 (step 906). The RRCReconfiguration, contains the condition(s) which the UE 500 should monitor and the message to be applied when the condition(s) are fulfilled. The UE 500 responds with an RRCReconfigurationComplete (step 908). The UE 500 also sends an RRCReconfigurationComplete for the target candidate SCG to the MN 502 (910). Sometime thereafter, the MN 502 sends, to the SN 504, a SN Release Request including one or more cell IDs of the one or more respective PSCells for which CPA is being cancelled (step 912). As discussed below, the SN Release Request message is only an example. Other types messages may be used for CPA cancellation. The SN 504 sends an SN Release Request ACK to the MN 502 (step 914). The SN Release Request ACK includes bearer config*+RRCReconfiguration** are included in an outer RRCReconfiguration message generated by the MN 502. The MN 502 sends this RRCReconfiguration message to the UE 500, where this RRCReconfiguraiton message includes information that removes the CPA for the one or more PSCells indicated by the one or more cell IDs in the SN Release Request message (step 916). The UE 500 returns an RRCReconfigurationComplete to the MN 502 (step 918).

Master Node Execution. The present disclosure comprises a method executed by a MN (e.g., MN 502), the method comprising requesting a SN (e.g., SN 504) to prepare a conditional SN addition (including an indication of CPA for one or more PSCells) (e.g., FIG. 9, step 902), receiving a response to the conditional SN addition request confirming that a UE may be accepted unless a canceling message is later received (e.g., FIG. 9, step 904), and sending a cancelling indication indicating that a previously provided conditional SN addition configuration is not valid (e.g., FIG. 9, step 912). That sending of a cancellation indication may be triggered by the MN upon determining that traffic demands have been reduced, and the UE (e.g., UE 500) may not need to be configured with MR-DC and/or due to the MN determining to transition the UE to RRC_IDLE and/or upon the MN determining that the UE has initiated a re-establishment procedure (e.g. by reception at the MN of a UE context fetching request) and/or the UE has executed CPA in another target candidate PSCell for CPA (i.e. MN is responsible to cancel CPA in other candidate nodes).

In a first embodiment, the cancelling indication can be a list of PSCells to be cancelled contained in a S-NODE RELEASE REQUEST message. That message is to be interpreted by the recipient as the release of a subset of configured candidate PSCells, not the release of all resources of the target candidate SN, except if all configured cells are being canceled, where in this case the SN could omit the list of cells. In this case there may be a response message from the SN to the MN to acknowledge that the SN has received the message and performed the cancelling.

In a second embodiment, the cancelling indication can be a list of PSCells to be cancelled contained in a S-NODE MODIFICATION REQUEST message. In this case there may be a response message from the SN to the MN to acknowledge that the SN has received the message and performed the cancelling.

In a third embodiment, the cancelling indication can be a list of PSCells to be cancelled contained in a new message. In response to receiving this indication the SN may provide an SCG reconfiguration to be used by the MN to possibly update the UE. For example, if the MN requests the canceling of a subset of configured candidate cells for which the monitoring was associated to measId(1) and measID(5), the SN may remove these associated configurations by updating the SCG MeasConfig. That SCG update is to be included in the MN generated message to be provided to the UE for removing the CPA configurations, as an SCG configuration.

Secondary Node Execution. The present disclosure comprises a method executed by a SN (e.g., SN 504), where the method comprises receiving a cancelling indication indicating that a previously provided conditional SN addition configuration is not valid (e.g., FIG. 9, step 912). The RRC reconfiguration towards the UE (e.g., UE 500) is done in the same way as described above, by sending an RRC message, e.g. an RRCReconfiguration, containing condConfig-ToRemoveList for the conditional reconfigurations to be removed.

At the UE side, the UE (e.g., UE 500) perform the following actions.
***UE Actions (see 3GPP TS 38.331)***
5.3.5.13 Conditional Reconfiguration
5.3.5.13.1 General
The network configures the UE with one or more candidate target SpCells in the conditional reconfiguration. The UE evaluates the condition of each configured candidate target SpCell. The UE applies the conditional reconfiguration associated with one of the target SpCells which fulfils associated execution condition. The network provides the configuration parameters for the target SpCell in the ConditionalReconfiguration IE.
The UE performs the following actions based on a received ConditionalReconfiguration IE:
    1> if the ConditionalReconfiguration contains the condReconfigToRemoveList:
        2> perform conditional reconfiguration removal procedure as specified in 5.3.5.13.2;
( ... )
5.3.5.13.2 Conditional Reconfiguration Removal
The UE shall:
    1> for each condReconfigId value included in the condReconfigToRemoveList that is part of the current UE conditional reconfiguration in VarConditionalReconfig:
        2> remove the entry with the matching condReconfigId from the VarConditionalReconfig;
    NOTE: The UE does not consider the message as erroneous if the condReconfigToRemoveList includes any condReconfigId value that is not part of the current UE configuration.
***End UE Actions***
Upon removing the indicate entry or entries, the UE stops monitoring the CPA associated conditions.
In the first embodiment, the MN indicates to the SN, in an S-NODE RELEASE REQUEST message, which CPA configurations that should be cancelled, e.g. by a list of cells or a list of conditional reconfiguration ID(s). The original purpose of the message in prior art was to release all resources in an SN, however, according to the method that may not necessarily occur i.e. only the resources associated to the CPA candidates to be canceled are to be released (except if all candidate cells are to be released; in that case the MN may even omit the list of cells and simply send the S-NODE RELEASE REQUEST).
An example implementation may look like the following in 3GPP TS 38.423.
***Example Implementation in TS 38.423***
9.1.2.14 S-Node Release Request
This message is sent by the M-NG-RAN node to the S-NG-RAN node to request the release of resources.
Direction: M-NG-RAN node S-NG-RAN node.

```
-- ASN1START
-- TAG-CONDITIONALRECONFIGURATION-START
ConditionalReconfiguration-r16 ::=        SEQUENCE {
    attemptCcondReconfig-r16            ENUMERATED {true}        OPTIONAL, -- Need N
    condConfigToRemoveList-r16      CondConfigToRemoveList-r16    OPTIONAL, -- Need N
    condConfigToAddModList-r16      CondConfigToAddModList-r16    OPTIONAL, -- Need N
    ...
}
CondConfigToRemoveList-r16 ::=      SEQUENCE (SIZE (1.. maxNrofCondCells)) OF CondConfigId-
r16
-- TAG-CONDITIONALRECONFIGURATION-STOP
-- ASN1STOP
```

| IE/Group Name | Presence | Range | IE type and reference | Semantics description | Criticality | Assigned Criticality |
|---|---|---|---|---|---|---|
| Message Type | M | | 9.2.3.1 | | YES | reject |
| M-NG-RAN node UE XnAP ID | M | | NG-RAN node UE XnAP ID 9.2.3.16 | Allocated at the M-NG-RAN node | YES | reject |
| S-NG-RAN node UE XnAP ID | O | | NG-RAN node UE XnAP ID 9.2.3.16 | Allocated at the S-NG-RAN node | YES | reject |
| Cause | M | | 9.2.3.2 | | YES | ignore |
| PDU Session Resources To Be Released List | O | | PDU session List with Cause 9.2.1.26 | | YES | ignore |
| UE Context Kept Indicator | O | | 9.2.3.68 | | YES | ignore |
| M-NG-RAN node to S-NG-RAN node Container | O | | OCTET STRING | Includes the CG-ConfigInfo message as defined in subclause 11.2.2 of TS 38.331 [10]. | YES | ignore |
| DRBs transferred to MN | O | | DRB List 9.2.1.29 | Indicates that the target M-NG-RAN node reconfigured the listed DRBs as MN-terminated bearers. | YES | ignore |
| Candidate PSCells To Be Cancelled List | | 0 .. <maxnoofCellsinCPA> | | | YES | reject |
| >Target Cell ID | M | | Target Cell Global ID 9.2.3.25 | | — | — |

| Range bound | Explanation |
|---|---|
| maxnoofPDUSessions | Maximum no. of PDU sessions. Value is 256 |

***End Example Implementation in TS 38.423***

In the second embodiment, the MN indicates to the SN, in an S-NODE MODIFICATION REQUEST message, which CPA configurations that should be cancelled, e.g. by a list of cells or a list of conditional reconfiguration ID, similar for S-NODE RELEASE REQUEST shown above.

In the third embodiment, the MN indicates to the SN, in a new message e.g. CPA CANCEL, which CPA configurations that should be cancelled, e.g. by a list of cells or a list of conditional reconfiguration ID, similar for S-NODE RELEASE REQUEST shown above.

3 SN Generated Conditional PSCell Addition, Target Initiated Cancel

In this option the SN generates the RRC message, e.g. RRCReconfiguration, containing the condition(s) which the UE should monitor and the message to be applied when the condition(s) are fulfilled. However, after CPA has been configured, the SN decides to cancel the CPA, see FIG. 10.

Figure 10:
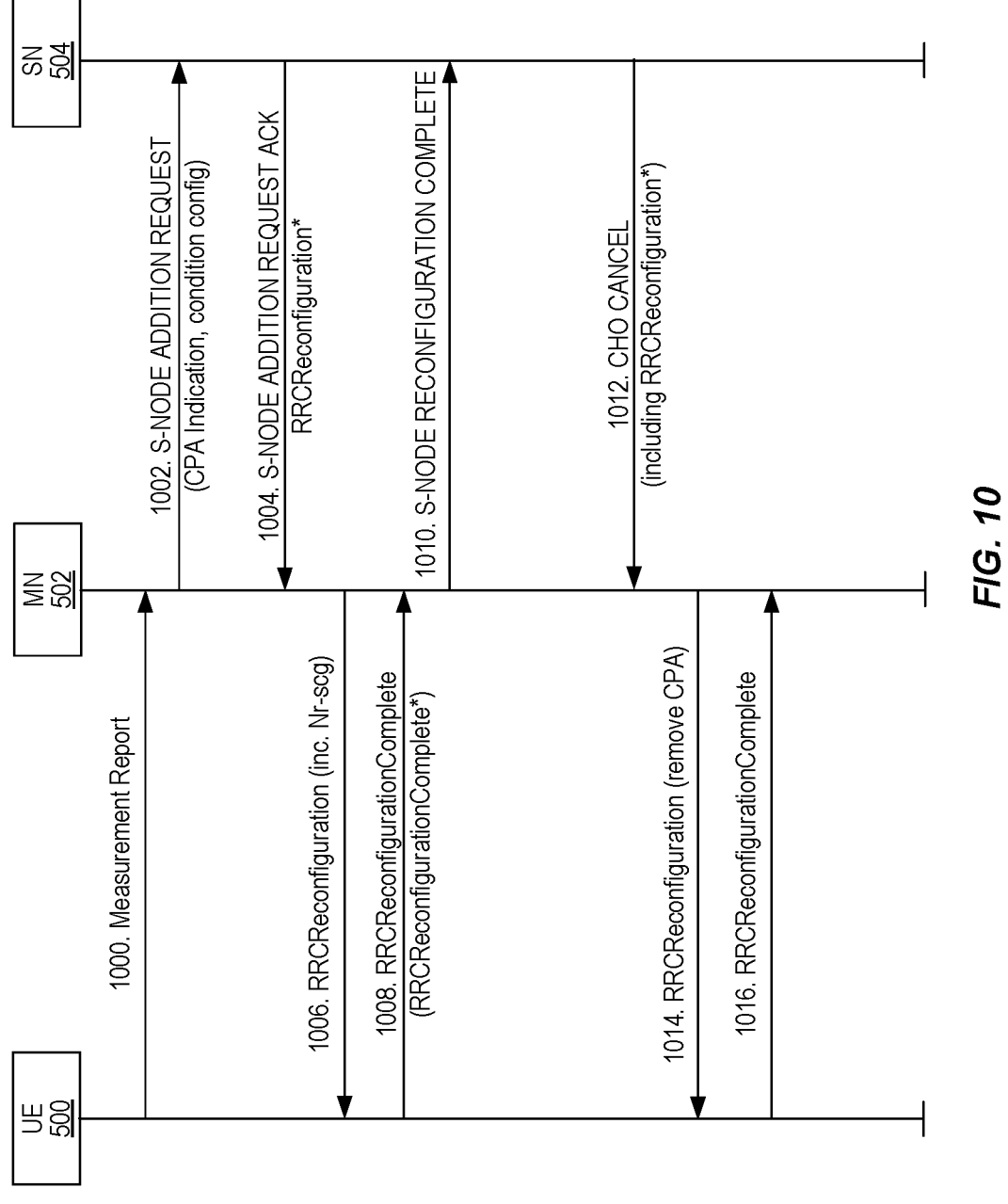
FIG. 10 illustrates the operation of the UE, the MN, and the SN for SN-initiated cancellation of CPA with SN-generated RRCReconfiguration in accordance with another embodiment of the present disclosure.

In this regard, FIG. 10 illustrates the operation of the UE 500, the MN 502, and the SN 504 for SN-initiated cancellation of CPA with SN-generated RRCReconfiguration in accordance with another embodiment of the present disclosure. As illustrated, the UE 500 sends a measurement report to the MN 502 (step 1000). Based on the measurement report, the MN 502 sends a SN Addition Request to the SN 504 (step 1002). The SN Addition Request comprises a CPA indication and a condition configuration. The SN 504 returns a SN Addition Request ACK to the MN 502 (step 1004). The SN Addition Request ACK includes an RRCReconfiguration including CPA to be sent to the UE 500. The MN 502 sends the RRCReconfiguration including CPA to the UE 500 (step 1006). The RRCReconfiguration, contains the condition(s) which the UE 500 should monitor and the message to be applied when the condition(s) are fulfilled. The UE 500 responds with an RRCReconfigurationComplete (step 1008). The MN 502 sends an S-NODE reconfiguration complete message to the SN 504 (step 1010). Sometime after receiving SN Addition Request in step 1002, the SN 504 sends a CHO Cancel message including an RRCReconfiguration that removes the CPA for the one or more respective PSCells for which CPA is being cancelled (step 1012). As discussed below, the CHO Cancel message is only an example. Other types messages may be used for CPA cancellation. The MN 502 sends the RRCReconfiguration message from the CHO Cancel message to the UE 500 (step 1014). The UE 500 returns an RRCReconfigurationComplete to the MN 502 (step 1016).

Secondary Node Execution. The present disclosure comprises a method executed by a SN (e.g., SN 504), the method comprising transmitting a cancelling indication to a MN (e.g., MN 502) indicating that a previously configured conditional SN addition configuration is not valid (e.g., FIG. 10, step 1012). That may include additional information such as an SCG reconfiguration to be provided to the UE (e.g., UE 500) e.g. containing the CPA configuration indicating the UE which CPA configuration/PScell candidates are to be removed.

Master Node Execution. The present disclosure comprises a method executed by a MN (e.g., MN 502), the method comprising transmitting a conditional SN addition request to a target SN (e.g., FIG. 10, step 1002), receiving a response to the conditional SN addition request confirming that a UE may be accepted unless a canceling message is later received (e.g., FIG. 10, step 1004), and receiving a cancelling indication from a target SN indicating that a previously provided conditional SN addition configuration is not valid (e.g., FIG. 10, step 1012). In one embodiment, the cancelling indication can be a list of PSCells to be cancelled contained in a S-NODE RELEASE REQUIRED message. In another embodiment the cancelling indication can be a new message e.g. CPA CANCEL sent by the SN to the MN. In another embodiment the cancelling indication can be included in a CONDITIONAL HANDOVER CANCEL message. In another embodiment the cancelling indication also contains an RRCReconfiguration message including the new CPA configuration for which the cancelled candidate PSCells are removed from CPA configuration. Re-configuring a UE to cancel or update a conditional PSCell addition associated to the SN that has sent the cancelling indication e.g. according to the RRCReconfiguration provided by the target candidate SN. From the MN's perspective, the CPA updates is transparent as that is provided to the UE as an SCG configuration e.g. within nr-scg container=RRCReconfiguration wherein CPA includes the condReconfigToRemoveList.

The difference compared to MN generated CPA, target initiated cancel, is that in this case the cancellation messages towards the MN also may include the reconfiguration message to the UE, typically an RRCReconfiguration. The reason for that is the it is the SN that generated the original message in which CPA was configured and then also the SN generates the message that cancels CPA.

In an example implementation the S-NODE RELEASE REQUIRED contains the cells for which CPA should be cancelled, or alternatively the conditional reconfiguration ID, and also a container with the RRC message to be sent to the UE.

***Example Implementation as Revisions to 3GPP TS 38.423***

9.1.2.17 S-Node Release Required

This message is sent by the S-NG-RAN node to request the release of all resources for a specific UE at the S-NG-RAN node.

Direction: S-NG-RAN node M-NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| M-NG-RAN node UE XnAP ID | M | | NG-RAN node UE XnAP ID 9.2.3.16 | Allocated at the M-NG-RAN node | YES | reject |
| S-NG-RAN node UE XnAP ID | M | | NG-RAN node UE XnAP ID 9.2.3.16 | Allocated at the S-NG-RAN node | YES | reject |
| PDU sessions To Be Released | | 0..1 | | | YES | ignore |
| >PDU Session Resources to be released List - SN terminated | O | | PDU session List with data forwarding request info 9.2.1.24 | | — | |
| Cause | M | | 9.2.3.2 | | YES | ignore |
| S-NG-RAN node to M-NG-RAN node Container | O | | OCTET STRING | Includes the CG-Config message as defined in TS 38.331 [10]. | YES | ignore |
| Candidate | | 0 .. | | | YES | reject |

-continued

| IE/Group Name | Presence | Range | IE type and reference | Semantics description | Criticality | Assigned Criticality |
|---|---|---|---|---|---|---|
| PSCells To Be Cancelled List | | <maxnoofCellsinCPA> | | | | |
| >Target Cell ID | M | | Target Cell Global ID 9.2.3.25 | | — | — |
| S-NG-RAN node to UE Container | | | OCTET STRING | Includes the RRCReconfiguration as defined in TS 38.331 [10]. | YES | ignore |

| Range bound | Explanation |
|---|---|
| maxnoofCellsinCPA | Maximum no. cells that can be prepared for a conditional SN Addition. Value is 8. |

***End Example Implementation***

4 SN Generated Conditional PSCell Addition, MN Initiated Cancel

Figure 11:
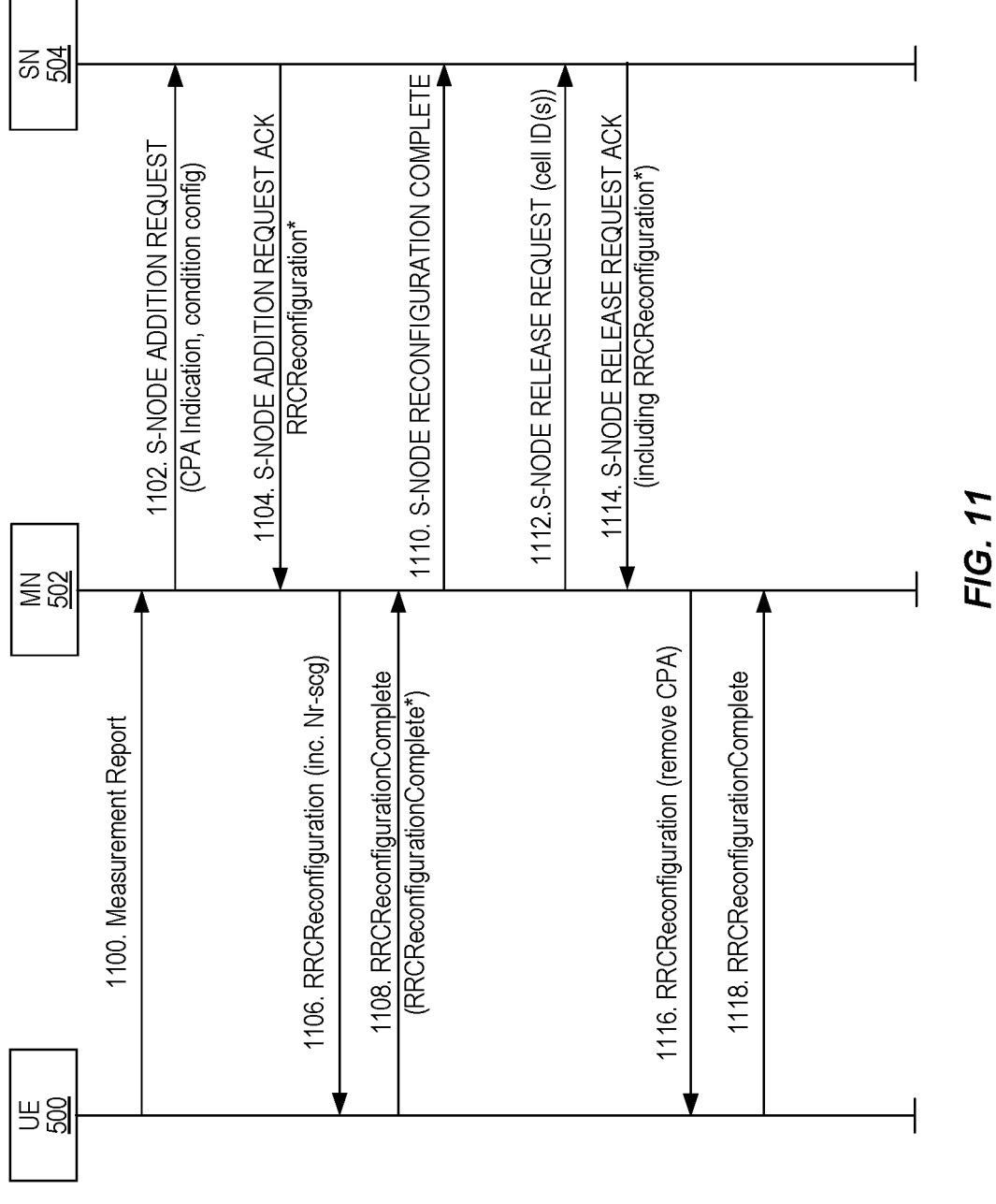
FIG. 11 illustrates the operation of the UE, the MN, and the SN for SN generated CPA with MN-initiated CPA cancellation in accordance with another embodiment of the present disclosure.

As in Section 3, the SN generates the RRC message, e.g. RRCReconfiguration, containing the condition(s) which the UE should monitor and the message to be applied when the condition(s) are fulfilled. However, after CPA has been configured, the MN decides to cancel the CPA as described above with respect to FIG. 9. In this regard, FIG. 11 illustrates the operation of the UE 500, the MN 502, and the SN 504 for SN generated CPA with MN-initiated CPA cancellation in accordance with another embodiment of the present disclosure. As illustrated, the UE 500 sends a measurement report to the MN 502 (step 1100). Based on the measurement report, the MN 502 sends a SN Addition Request to the SN 504 (step 1102). The SN Addition Request comprises a CPA indication and condition configuration. The SN 504 returns a SN Addition Request ACK to the MN 502 (step 1104). The SN Addition Request ACK includes an RRCReconfiguraiton including a CPA to be sent to the UE 500. The MN 502 sends the RRCReconfiguration including CPA to the UE 500 (step 1106). The RRCReconfiguration, contains the condition(s) which the UE 500 should monitor and the message to be applied when the condition(s) are fulfilled. The UE 500 responds with an RRCReconfigurationComplete (step 1108). The MN 500 sends an S-NODE Reconfiguration Complete message to the SN 504 (1110). Sometime thereafter, the MN 502 sends, to the SN 504, a SN Release Request including one or more cell IDs of the one or more respective PSCells for which CPA is being cancelled (step 1112). As discussed below, the SN Release Request message is only an example. Other types messages may be used for CPA cancellation. The SN 504 sends an SN Release Request ACK to the MN 502, where the SN Release ACK includes an RRCReconfiguration message that removes the one or more CPAs for the PSCells being cancelled (step 1114). The MN 502 sends the RRCReconfiguration message to the UE 500 (step 1116). The UE 500 returns an RRCReconfigurationComplete to the MN 502 (step 1118).

The present disclosure comprises a method executed by a SN (e.g., SN 504), where the method comprises receiving a request from a MN (e.g., MN 502) to prepare a conditional SN addition (including an indication of CPA for one or more PSCells) (e.g., FIG. 11, step 1102), transmitting to the MN a response to the conditional SN addition request confirming that a UE may be accepted unless a canceling message is later received (e.g., FIG. 11, step 1104), and receiving a cancelation indication indicating that a previously provided conditional SN addition configuration is not valid (e.g., FIG. 11, step 1112).

In a first embodiment, the cancelling indication can be a list of PSCells to be cancelled contained in a S-NODE RELEASE REQUEST message. In a second embodiment, the cancelling indication can be a list of PSCells to be cancelled contained in a S-NODE MODIFICATION REQUEST message. In a third embodiment, the cancelling indication can be a list of PSCells to be cancelled contained in a new message.

The present disclosure comprises a method executed by a MN (e.g., MN 502), where the method comprises transmitting a cancelation indication indicating that a previously provided conditional SN addition configuration is not valid (e.g., FIG. 11, step 1112).

5 UE Actions

The present disclosure comprises a method executed by a UE (e.g., UE 500), where the method comprises receiving a RRCReconfiguration message from a MN (e.g., MN 502) and deleting the configuration for one or multiple conditional candidate PSCells (e.g., FIG. 5, step 520; FIG. 9, step 916; FIG. 10, step 1014; FIG. 11, step 1116). The UE configured with CPA receives from the network (e.g. a gNodeB to become an MN upon CPA execution, or called in the document MN for simplicity) an RRCReconfiguration message that includes a condConfigToRemoveList as part of the CPA configuration (which is within the IE Conditional-Reconfiguration), as shown below:

```
-- ASN1START
-- TAG-CONDITIONALRECONFIGURATION-START
ConditionalReconfiguration-r16 ::=        SEQUENCE {
    attemptCcondReconfig-r16              ENUMERATED {true}        OPTIONAL, -- Need N
```

-continued

```
condConfigToRemoveList-r16    CondConfigToRemoveList-r16    OPTIONAL, -- Need N
condConfigToAddModList-r16    CondConfigToAddModList-r16    OPTIONAL, -- Need N
    ...
}
CondConfigToRemoveList-r16 ::=    SEQUENCE (SIZE (1.. maxNrofCondCells)) OF CondConfigId-
r16
-- TAG-CONDITIONALRECONFIGURATION-STOP
-- ASN1STOP
```

In one embodiment, the ConditionalReconfiguration is part of the MCG configuration i.e. is received within the received message. The message may also contain a MeasConfig IE including an indication for removing/releasing/deleting the measId(s) (and associated reportConfig and/or measurement object, if only configured for the target candidate PScells to be removed).

In another embodiment, the ConditionalReconfiguration is part of the SCG configuration i.e. is received within an SCG RRCReconfiguration included within the received message (e.g., nr-scg). The SCG RRCReconfiguration message may contain an SCG MeasConfig IE including an indication for removing/releasing/deleting the measId(s) (and associated reportConfig and/or measurement object, if only configured for the target candidate PScells to be removed).

At the UE side, the UE perform the following actions upon applying the received ConditionalReconfiguration IE for CPA.

***UE Actions (See 3GPP TS 38.331)***

5.3.5.13 Conditional Reconfiguration 5.3.5.13.1 General

The network configures the UE with one or more candidate target SpCells in the conditional reconfiguration. The UE evaluates the condition of each configured candidate target SpCell. The UE applies the conditional reconfiguration associated with one of the target SpCells which fulfils associated execution condition. The network provides the configuration parameters for the target SpCell in the ConditionalReconfiguration IE.

The UE performs the following actions based on a received ConditionalReconfiguration IE:

1> if the ConditionalReconfiguration contains the condReconfigToRemoveList:

2> perform conditional reconfiguration removal procedure as specified in 5.3.5.13.2;

( . . . )

5.3.5.13.2 Conditional Reconfiguration Removal

The UE shall:

1> for each condReconfigId value included in the condReconfigToRemoveList that is part of the current UE conditional reconfiguration in VarConditionalReconfig:

2> remove the entry with the matching condReconfigId from the VarConditionalReconfig;

NOTE: The UE does not consider the message as erroneous if the condReconfigToRemoveList includes any condReconfigId value that is not part of the current UE configuration.

( . . . )

5.5.2.2 Measurement Identity Removal

The UE shall:

1> for each measId included in the received measIdToRemoveList that is part of the current UE configuration in VarMeasConfig:

2> remove the entry with the matching measId from the measIdList within the VarMeasConfig;

2> remove the measurement reporting entry for this measId from the VarMeasReportList, if included;

2> stop the periodical reporting timer or timer T321 or timer T322, whichever one is running, and reset the associated information (e.g., timeToTrigger) for this measId.

NOTE: The UE does not consider the message as erroneous if the measIdToRemoveList includes any measId value that is not part of the current UE configuration.

( . . . )

5.5.2.4 Measurement Object Removal

The UE shall:

1> for each measObjectId included in the received measObjectToRemoveList that is part of measObjectList in VarMeasConfig:

2> remove the entry with the matching measObjectId from the measObjectList within the VarMeasConfig;

2> remove all measId associated with this measObjectId from the measIdList within the VarMeasConfig, if any;

2> if a measId is removed from the measIdList:

3> remove the measurement reporting entry for this measId from the VarMeasReportList, if included;

3> stop the periodical reporting timer or timer T321 or timer T322, whichever is running, and reset the associated information (e.g., timeToTrigger) for this measId.

NOTE: The UE does not consider the message as erroneous if the measObjectToRemoveList includes any measObjectId value that is not part of the current UE configuration.

( . . . )

5.5.2.6 Reporting Configuration Removal

The UE shall:

1> for each reportConfigId included in the received reportConfigToRemoveList that is part of the current UE configuration in VarMeasConfig:

2> remove the entry with the matching reportConfigId from the reportConfigList within the VarMeasConfig;

2> remove all measId associated with the reportConfigId from the measIdList within the VarMeasConfig, if any;

2> if a measId is removed from the measIdList:

3> remove the measurement reporting entry for this measId from the VarMeasReportList, if included;

3> stop the periodical reporting timer or timer T321 or timer T322, whichever one is running, and reset the associated information (e.g., timeToTrigger) for this measId.

NOTE: The UE does not consider the message as erroneous if the reportConfigToRemoveList includes any reportConfigId value that is not part of the current UE configuration.

***End UE Actions***

6 Further Details

Figure 12:
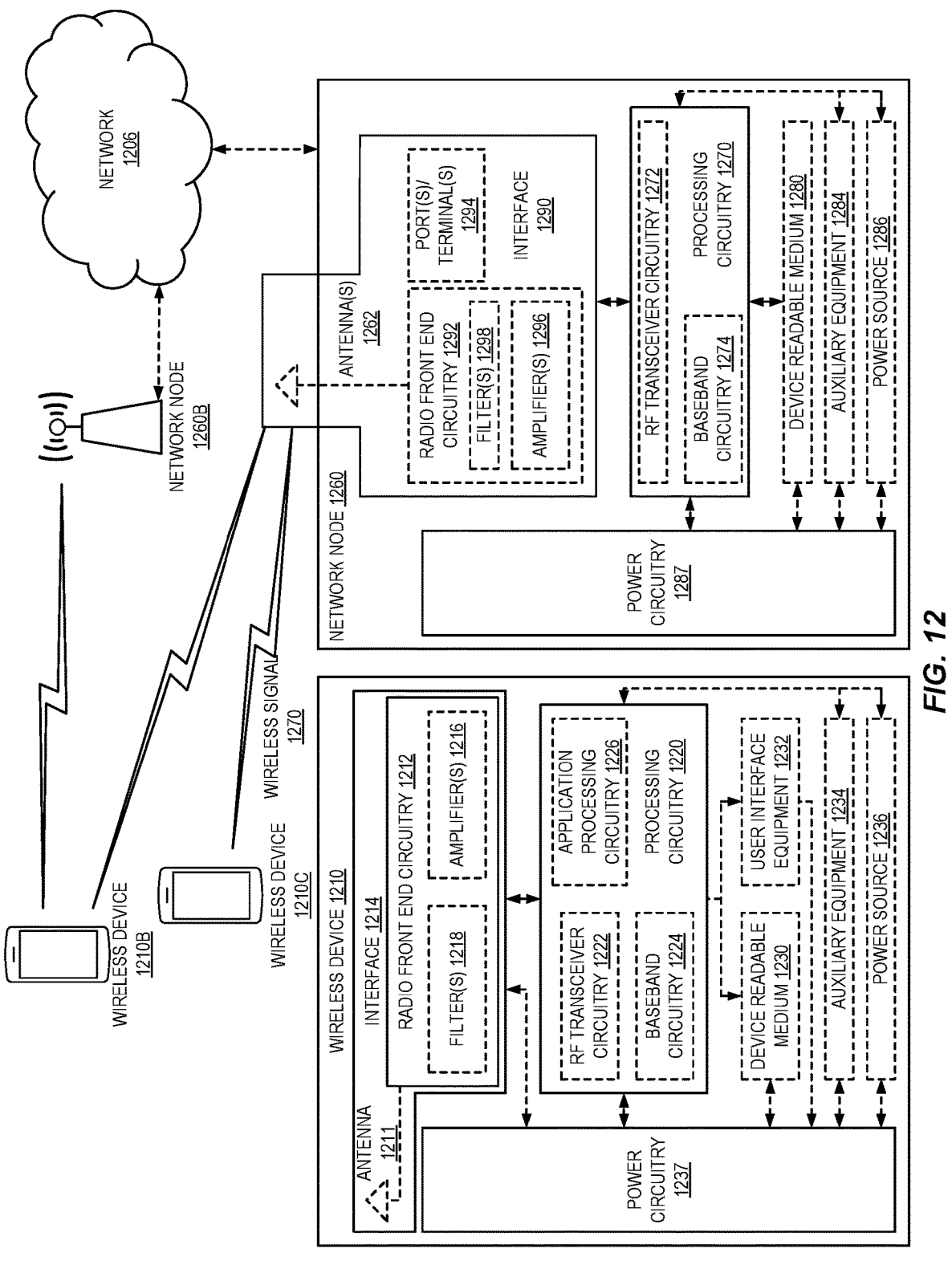
FIG. 12 illustrates one example of a wireless network in which embodiments of the present disclosure may be implemented.

Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network 1206, network nodes 1260 and 1260*b*, and WDs 1210, 1210*b*, and 1210*c*. In practice, a wireless network may further include any additional elements suitable to support communication between wireless devices or between a wireless device and another communication device, such as a landline telephone, a service provider, or any other network node or end device. Of the illustrated components, network node 1260 and wireless device (WD) 1210 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1206 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1260 and WD 1210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node 1260 includes processing circuitry 1270, device readable medium 1280, interface 1290, auxiliary equipment 1284, power source 1286, power circuitry 1287, and antenna 1262. Although network node 1260 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of network node 1260 are depicted as single boxes located within a larger box, or nested within multiple boxes, in practice, a network node may comprise multiple different physical components that make up a single illustrated component (e.g., device readable medium 1280 may comprise multiple separate hard drives as well as multiple RAM modules).

Similarly, network node 1260 may be composed of multiple physically separate components (e.g., a NodeB component and a RNC component, or a BTS component and a BSC component, etc.), which may each have their own respective components. In certain scenarios in which network node 1260 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1260 may be configured to support multiple radio access technologies (RATs). In such embodiments, some components may be duplicated (e.g., separate device readable medium 1280 for the different RATs) and some components may be reused (e.g., the same antenna 1262 may be shared by the RATs). Network node 1260 may also include multiple sets of the various illustrated components for different wireless technologies integrated into network node 1260, such as, for example, GSM, WCDMA, LTE, NR, WiFi, or Bluetooth wireless technologies. These wireless technologies may be integrated into the same or different chip or set of chips and other components within network node 1260.

Processing circuitry 1270 is configured to perform any determining, calculating, or similar operations (e.g., certain obtaining operations) described herein as being provided by a network node. These operations performed by processing circuitry 1270 may include processing information obtained by processing circuitry 1270 by, for example, converting the obtained information into other information, comparing the obtained information, or converted information to information stored in the network node, and/or performing one or more operations based on the obtained information or converted information, and as a result of said processing making a determination.

Processing circuitry 1270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1260 components, such as device readable medium 1280, network node 1260 functionality. For example, processing circuitry 1270 may execute instructions stored in device readable medium 1280 or in memory within processing circuitry 1270. Such functionality may include providing any of the various wireless features, functions, or benefits discussed herein. In some embodiments, processing circuitry 1270 may include a system on a chip (SOC).

In some embodiments, processing circuitry 1270 may include one or more of radio frequency (RF) transceiver circuitry 1272 and baseband processing circuitry 1274. In some embodiments, radio frequency (RF) transceiver circuitry 1272 and baseband processing circuitry 1274 may be on separate chips (or sets of chips), boards, or units, such as radio units and digital units. In alternative embodiments, part, or all of RF transceiver circuitry 1272 and baseband processing circuitry 1274 may be on the same chip or set of chips, boards, or units.

In certain embodiments, some or all of the functionality described herein as being provided by a network node, base station, eNB or other such network device may be performed by processing circuitry 1270 executing instructions stored on device readable medium 1280 or memory within processing circuitry 1270. In alternative embodiments, some or all of the functionality may be provided by processing circuitry 1270 without executing instructions stored on a separate or discrete device readable medium, such as in a hard-wired manner In any of those embodiments, whether executing instructions stored on a device readable storage medium or not, processing circuitry 1270 can be configured to perform the described functionality. The benefits provided by such functionality are not limited to processing circuitry 1270 alone or to other components of network node 1260, but are enjoyed by network node 1260 as a whole, and/or by end users and the wireless network generally.

Device readable medium 1280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1270. Device readable medium 1280 may store any suitable instructions, data, or information, including a computer program, software, an application including one or more of logic, rules, code, tables, etc. and/or other instructions capable of being executed by processing circuitry 1270 and, utilized by network node 1260. Device readable medium 1280 may be used to store any calculations made by processing circuitry 1270 and/or any data received via interface 1290. In some embodiments, processing circuitry 1270 and device readable medium 1280 may be considered to be integrated.

Interface 1290 is used in the wired or wireless communication of signalling and/or data between network node 1260, network 1206, and/or WDs 1210. As illustrated, interface 1290 comprises port(s)/terminal(s) 1294 to send and receive data, for example to and from network 1206 over a wired connection. Interface 1290 also includes radio front end circuitry 1292 that may be coupled to, or in certain embodiments a part of, antenna 1262. Radio front end circuitry 1292 comprises filters 1298 and amplifiers 1296. Radio front end circuitry 1292 may be connected to antenna 1262 and processing circuitry 1270. Radio front end circuitry may be configured to condition signals communicated between antenna 1262 and processing circuitry 1270. Radio front end circuitry 1292 may receive digital data that is to be sent out to other network nodes or WDs via a wireless connection. Radio front end circuitry 1292 may convert the digital data into a radio signal having the appropriate channel and bandwidth parameters using a combination of filters 1298 and/or amplifiers 1296. The radio signal may then be transmitted via antenna 1262. Similarly, when receiving data, antenna 1262 may collect radio signals which are then converted into digital data by radio front end circuitry 1292. The digital data may be passed to processing circuitry 1270. In other embodiments, the interface may comprise different components and/or different combinations of components.

In certain alternative embodiments, network node 1260 may not include separate radio front end circuitry 1292, instead, processing circuitry 1270 may comprise radio front end circuitry and may be connected to antenna 1262 without separate radio front end circuitry 1292. Similarly, in some embodiments, all or some of RF transceiver circuitry 1272 may be considered a part of interface 1290. In still other embodiments, interface 1290 may include one or more ports or terminals 1294, radio front end circuitry 1292, and RF transceiver circuitry 1272, as part of a radio unit (not shown), and interface 1290 may communicate with baseband processing circuitry 1274, which is part of a digital unit (not shown).

Antenna 1262 may include one or more antennas, or antenna arrays, configured to send and/or receive wireless signals. Antenna 1262 may be coupled to radio front end circuitry 1290 and may be any type of antenna capable of transmitting and receiving data and/or signals wirelessly. In some embodiments, antenna 1262 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1262 may be separate from network node 1260 and may be connectable to network node 1260 through an interface or port.

Antenna 1262, interface 1290, and/or processing circuitry 1270 may be configured to perform any receiving operations and/or certain obtaining operations described herein as being performed by a network node. Any information, data and/or signals may be received from a wireless device, another network node and/or any other network equipment. Similarly, antenna 1262, interface 1290, and/or processing circuitry 1270 may be configured to perform any transmitting operations described herein as being performed by a network node. Any information, data and/or signals may be transmitted to a wireless device, another network node and/or any other network equipment.

Power circuitry 1287 may comprise, or be coupled to, power management circuitry and is configured to supply the components of network node 1260 with power for performing the functionality described herein. Power circuitry 1287 may receive power from power source 1286. Power source 1286 and/or power circuitry 1287 may be configured to provide power to the various components of network node 1260 in a form suitable for the respective components (e.g., at a voltage and current level needed for each respective component). Power source 1286 may either be included in, or external to, power circuitry 1287 and/or network node 1260. For example, network node 1260 may be connectable to an external power source (e.g., an electricity outlet) via an input circuitry or interface such as an electrical cable, whereby the external power source supplies power to power circuitry 1287. As a further example, power source 1286 may comprise a source of power in the form of a battery or battery pack which is connected to, or integrated in, power circuitry 1287. The battery may provide backup power should the external power source fail. Other types of power sources, such as photovoltaic devices, may also be used.

Alternative embodiments of network node 1260 may include additional components beyond those shown in FIG. 12 that may be responsible for providing certain aspects of the network node's functionality, including any of the functionality described herein and/or any functionality necessary to support the subject matter described herein. For example, network node 1260 may include user interface equipment to allow input of information into network node 1260 and to allow output of information from network node 1260. This may allow a user to perform diagnostic, maintenance, repair, and other administrative functions for network node 1260.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1210 includes antenna 1211, interface 1214, processing circuitry 1220, device readable medium 1230, user interface equipment 1232, auxiliary equipment 1234, power source 1236 and power circuitry 1237. WD 1210 may include multiple sets of one or more of the illustrated components for different wireless technologies supported by WD 1210, such as, for example, GSM, WCDMA, LTE, NR, WiFi, WiMAX, or Bluetooth wireless technologies, just to mention a few. These wireless technologies may be integrated into the same or different chips or set of chips as other components within WD 1210.

Antenna 1211 may include one or more antennas or antenna arrays, configured to send and/or receive wireless signals, and is connected to interface 1214. In certain alternative embodiments, antenna 1211 may be separate from WD 1210 and be connectable to WD 1210 through an interface or port. Antenna 1211, interface 1214, and/or processing circuitry 1220 may be configured to perform any receiving or transmitting operations described herein as being performed by a WD. Any information, data and/or signals may be received from a network node and/or another WD. In some embodiments, radio front end circuitry and/or antenna 1211 may be considered an interface.

As illustrated, interface 1214 comprises radio front end circuitry 1212 and antenna 1211. Radio front end circuitry 1212 comprise one or more filters 1218 and amplifiers 1216. Radio front end circuitry 1214 is connected to antenna 1211 and processing circuitry 1220, and is configured to condition signals communicated between antenna 1211 and processing circuitry 1220. Radio front end circuitry 1212 may be coupled to or a part of antenna 1211. In some embodiments, WD 1210 may not include separate radio front end circuitry 1212; rather, processing circuitry 1220 may comprise radio front end circuitry and may be connected to antenna 1211. Similarly, in some embodiments, some or all of RF transceiver circuitry 1222 may be considered a part of interface 1214. Radio front end circuitry 1212 may receive digital data that is to be sent out to other network nodes or WDs via a wireless connection. Radio front end circuitry 1212 may convert the digital data into a radio signal having the appropriate channel and bandwidth parameters using a combination of filters 1218 and/or amplifiers 1216. The radio signal may then be transmitted via antenna 1211. Similarly, when receiving data, antenna 1211 may collect radio signals which are then converted into digital data by radio front end circuitry 1212. The digital data may be passed to processing circuitry 1220. In other embodiments, the interface may comprise different components and/or different combinations of components.

Processing circuitry 1220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1210 components, such as device readable medium 1230, WD 1210 functionality. Such functionality may include providing any of the various wireless features or benefits discussed herein. For example, processing circuitry 1220 may execute instructions stored in device readable medium 1230 or in memory within processing circuitry 1220 to provide the functionality disclosed herein.

As illustrated, processing circuitry 1220 includes one or more of RF transceiver circuitry 1222, baseband processing circuitry 1224, and application processing circuitry 1226. In other embodiments, the processing circuitry may comprise different components and/or different combinations of components. In certain embodiments processing circuitry 1220 of WD 1210 may comprise a SOC. In some embodiments, RF transceiver circuitry 1222, baseband processing circuitry 1224, and application processing circuitry 1226 may be on separate chips or sets of chips. In alternative embodiments, part or all of baseband processing circuitry 1224 and application processing circuitry 1226 may be combined into one chip or set of chips, and RF transceiver circuitry 1222 may be on a separate chip or set of chips. In still alternative embodiments, part or all of RF transceiver circuitry 1222 and baseband processing circuitry 1224 may be on the same chip or set of chips, and application processing circuitry 1226 may be on a separate chip or set of chips. In yet other alternative embodiments, part or all of RF transceiver circuitry 1222, baseband processing circuitry 1224, and application processing circuitry 1226 may be combined in the same chip or set of chips. In some embodiments, RF transceiver circuitry 1222 may be a part of interface 1214. RF transceiver circuitry 1222 may condition RF signals for processing circuitry 1220.

In certain embodiments, some or all of the functionality described herein as being performed by a WD may be provided by processing circuitry 1220 executing instructions stored on device readable medium 1230, which in certain embodiments may be a computer-readable storage medium. In alternative embodiments, some or all of the functionality may be provided by processing circuitry 1220 without executing instructions stored on a separate or discrete device readable storage medium, such as in a hard-wired manner In any of those particular embodiments, whether executing instructions stored on a device readable storage medium or not, processing circuitry 1220 can be configured to perform the described functionality. The benefits provided by such functionality are not limited to processing circuitry 1220 alone or to other components of WD 1210, but are enjoyed by WD 1210 as a whole, and/or by end users and the wireless network generally.

Processing circuitry 1220 may be configured to perform any determining, calculating, or similar operations (e.g., certain obtaining operations) described herein as being performed by a WD. These operations, as performed by processing circuitry 1220, may include processing information obtained by processing circuitry 1220 by, for example, converting the obtained information into other information, comparing the obtained information or converted information to information stored by WD 1210, and/or performing one or more operations based on the obtained information or converted information, and as a result of said processing making a determination.

Device readable medium 1230 may be operable to store a computer program, software, an application including one or more of logic, rules, code, tables, etc. and/or other instructions capable of being executed by processing circuitry 1220. Device readable medium 1230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1220. In some embodiments, processing circuitry 1220 and device readable medium 1230 may be considered to be integrated.

User interface equipment 1232 may provide components that allow for a human user to interact with WD 1210. Such interaction may be of many forms, such as visual, audial, tactile, etc. User interface equipment 1232 may be operable to produce output to the user and to allow the user to provide input to WD 1210. The type of interaction may vary depending on the type of user interface equipment 1232 installed in WD 1210. For example, if WD 1210 is a smart phone, the interaction may be via a touch screen; if WD 1210 is a smart meter, the interaction may be through a screen that provides usage (e.g., the number of gallons used) or a speaker that provides an audible alert (e.g., if smoke is detected). User interface equipment 1232 may include input interfaces, devices and circuits, and output interfaces, devices and circuits. User interface equipment 1232 is configured to allow input of information into WD 1210, and is connected to processing circuitry 1220 to allow processing circuitry 1220 to process the input information. User interface equipment 1232 may include, for example, a microphone, a proximity or other sensor, keys/buttons, a touch display, one or more cameras, a USB port, or other input circuitry. User interface equipment 1232 is also configured to allow output of information from WD 1210, and to allow processing circuitry 1220 to output information from WD 1210. User interface equipment 1232 may include, for example, a speaker, a display, vibrating circuitry, a USB port, a headphone interface, or other output circuitry. Using one or more input and output interfaces, devices, and circuits, of user interface equipment 1232, WD 1210 may communicate with end users and/or the wireless network, and allow them to benefit from the functionality described herein.

Auxiliary equipment 1234 is operable to provide more specific functionality which may not be generally performed by WDs. This may comprise specialized sensors for doing measurements for various purposes, interfaces for additional types of communication such as wired communications etc. The inclusion and type of components of auxiliary equipment 1234 may vary depending on the embodiment and/or scenario.

Power source 1236 may, in some embodiments, be in the form of a battery or battery pack. Other types of power sources, such as an external power source (e.g., an electricity outlet), photovoltaic devices or power cells, may also be used. WD 1210 may further comprise power circuitry 1237 for delivering power from power source 1236 to the various parts of WD 1210 which need power from power source 1236 to carry out any functionality described or indicated herein. Power circuitry 1237 may in certain embodiments comprise power management circuitry. Power circuitry 1237 may additionally or alternatively be operable to receive power from an external power source; in which case WD 1210 may be connectable to the external power source (such as an electricity outlet) via input circuitry or an interface such as an electrical power cable. Power circuitry 1237 may also in certain embodiments be operable to deliver power from an external power source to power source 1236. This may be, for example, for the charging of power source 1236. Power circuitry 1237 may perform any formatting, converting, or other modification to the power from power source 1236 to make the power suitable for the respective components of WD 1210 to which power is supplied.

Figure 13:
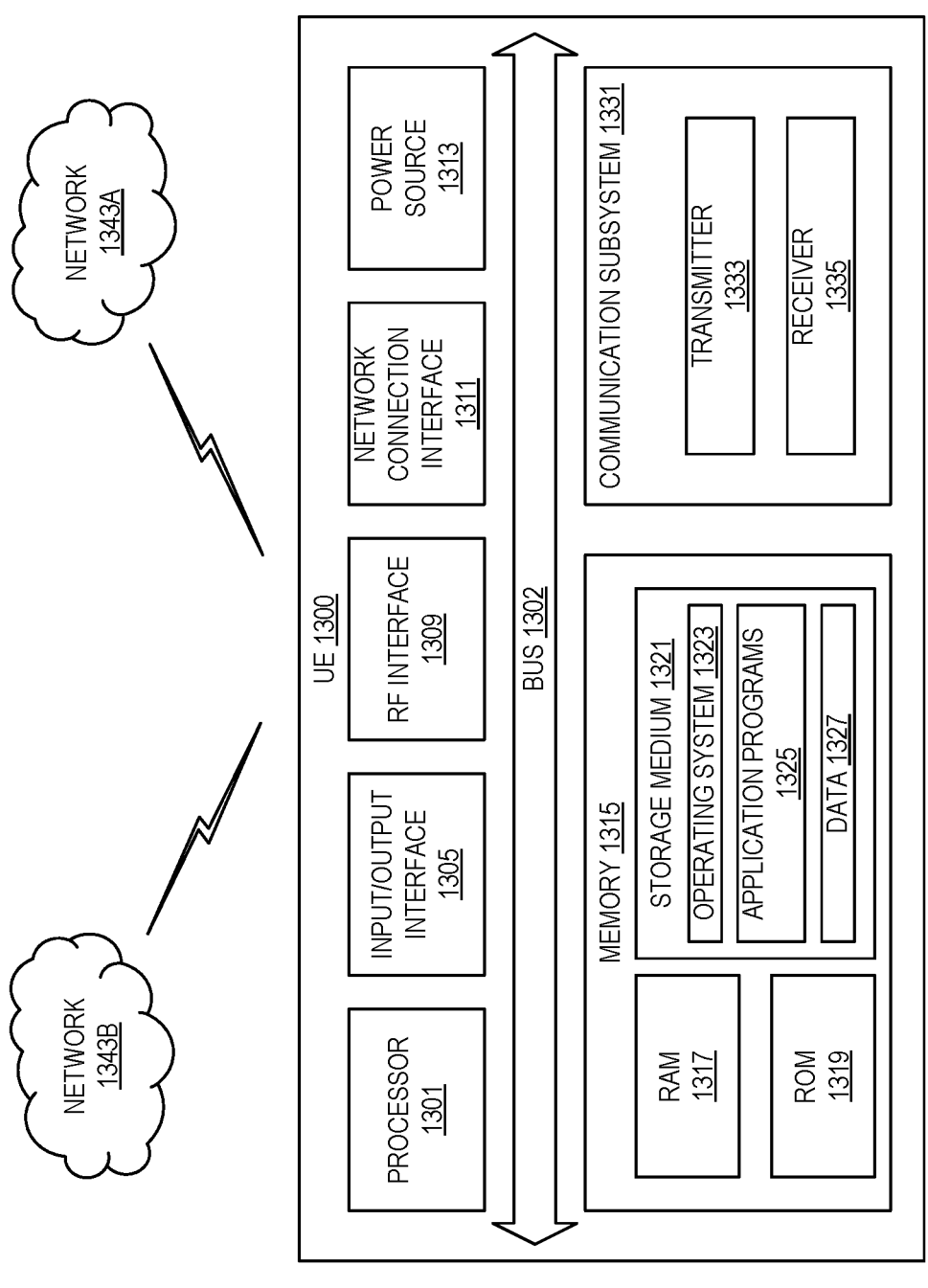
FIG. 13 illustrate a UE in accordance with some embodiments.

FIG. 13 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 13200 may be any UE identified by the 3$^{rd}$ Generation Partnership Project (3GPP), including a NB-IoT UE, a machine type communication (MTC) UE, and/or an enhanced MTC (eMTC) UE. UE 1300, as illustrated in FIG. 13, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 13 is a UE, the components discussed herein are equally applicable to a WD, and vice-versa.

In FIG. 13, UE 1300 includes processing circuitry 1301 that is operatively coupled to input/output interface 1305, radio frequency (RF) interface 1309, network connection interface 1311, memory 1315 including random access memory (RAM) 1317, read-only memory (ROM) 1319, and storage medium 1321 or the like, communication subsystem 1331, power source 1333, and/or any other component, or any combination thereof. Storage medium 1321 includes operating system 1323, application program 1325, and data 1327. In other embodiments, storage medium 1321 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry 1301 may be configured to process computer instructions and data. Processing circuitry 1301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1301 may include two central processing units (CPUs). Data may be information in a form suitable for use by a computer.

In the depicted embodiment, input/output interface 1305 may be configured to provide a communication interface to an input device, output device, or input and output device. UE 1300 may be configured to use an output device via input/output interface 1305. An output device may use the same type of interface port as an input device. For example, a USB port may be used to provide input to and output from UE 1300. The output device may be a speaker, a sound card, a video card, a display, a monitor, a printer, an actuator, an emitter, a smartcard, another output device, or any combination thereof. UE 1300 may be configured to use an input device via input/output interface 1305 to allow a user to capture information into UE 1300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface 1309 may be configured to provide a communication interface to RF components such as a transmitter, a receiver, and an antenna. Network connection interface 1311 may be configured to provide a communication interface to network 1343$a$. Network 1343$a$ may encompass wired and/or wireless networks such as a local-area network (LAN), a wide-area network (WAN), a computer network, a wireless network, a telecommunications network, another like network or any combination thereof. For example, network 1343$a$ may comprise a Wi-Fi network. Network connection interface 1311 may be configured to include a receiver and a transmitter interface used to communicate with one or more other devices over a communication network according to one or more communication protocols, such as Ethernet, TCP/IP, SONET, ATM, or the like. Network connection interface 1311 may implement receiver and transmitter functionality appropriate to the communication network links (e.g., optical, electrical, and the like). The transmitter and receiver functions may share circuit components, software or firmware, or alternatively may be implemented separately.

RAM 1317 may be configured to interface via bus 1302 to processing circuitry 1301 to provide storage or caching of data or computer instructions during the execution of software programs such as the operating system, application programs, and device drivers. ROM 1319 may be configured to provide computer instructions or data to processing circuitry 1301. For example, ROM 1319 may be configured to store invariant low-level system code or data for basic system functions such as basic input and output (I/O), startup, or reception of keystrokes from a keyboard that are stored in a non-volatile memory. Storage medium 1321 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1321 may be configured to include operating system 1323, application program 1325 such as a web browser application, a widget or gadget engine or another application, and data file 1327. Storage medium 1321 may store, for use by UE 1300, any of a variety of various operating systems or combinations of operating systems.

Storage medium 1321 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1321 may allow UE 1300 to access computer-executable instructions, application programs or the like, stored on transitory or non-transitory memory media, to off-load data, or to upload data. An article of manufacture, such as one utilizing a communication system may be tangibly embodied in storage medium 1321, which may comprise a device readable medium.

In FIG. 13, processing circuitry 1301 may be configured to communicate with network 1343b using communication subsystem 1331. Network 1343a and network 1343b may be the same network or networks or different network or networks. Communication subsystem 1331 may be configured to include one or more transceivers used to communicate with network 1343b. For example, communication subsystem 1331 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1333 and/or receiver 1335 to implement transmitter or receiver functionality, respectively, appropriate to the RAN links (e.g., frequency allocations and the like). Further, transmitter 1333 and receiver 1335 of each transceiver may share circuit components, software or firmware, or alternatively may be implemented separately.

In the illustrated embodiment, the communication functions of communication subsystem 1331 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1331 may include cellular communication, Wi-Fi communication, Bluetooth communication, and GPS communication. Network 1343b may encompass wired and/or wireless networks such as a local-area network (LAN), a wide-area network (WAN), a computer network, a wireless network, a telecommunications network, another like network or any combination thereof. For example, network 1343b may be a cellular network, a Wi-Fi network, and/or a near-field network. Power source 1313 may be configured to provide alternating current (AC) or direct current (DC) power to components of UE 1300.

The features, benefits and/or functions described herein may be implemented in one of the components of UE 1300 or partitioned across multiple components of UE 1300. Further, the features, benefits, and/or functions described herein may be implemented in any combination of hardware, software or firmware. In one example, communication subsystem 1331 may be configured to include any of the components described herein. Further, processing circuitry 1301 may be configured to communicate with any of such components over bus 1302. In another example, any of such components may be represented by program instructions stored in memory that when executed by processing circuitry 1301 perform the corresponding functions described herein. In another example, the functionality of any of such components may be partitioned between processing circuitry 1301 and communication subsystem 1331. In another example, the non-computationally intensive functions of any of such components may be implemented in software or firmware and the computationally intensive functions may be implemented in hardware.

Figure 14:
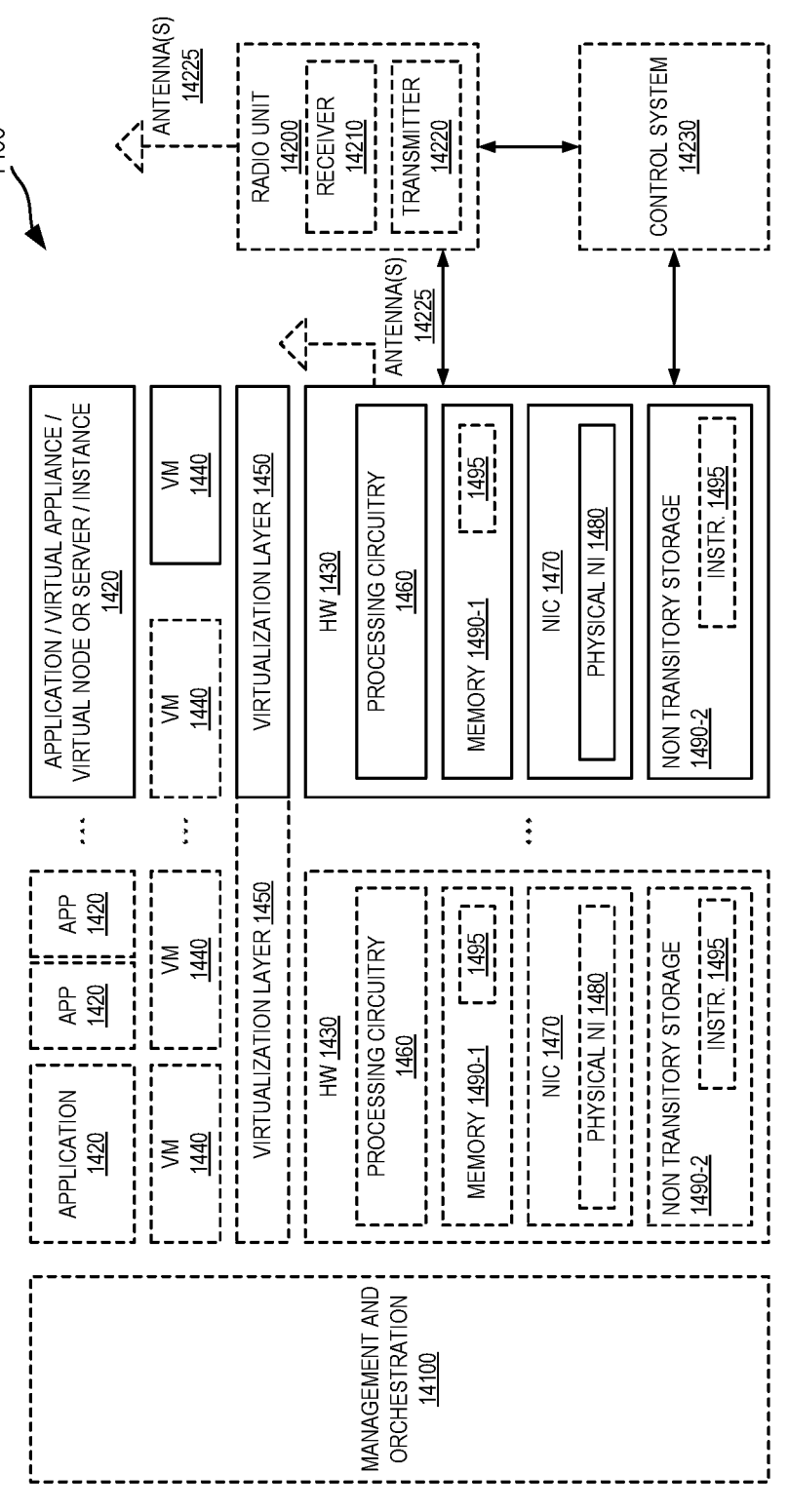
FIG. 14 illustrates a virtualization embodiment in accordance with some embodiments.

FIG. 14 is a schematic block diagram illustrating a virtualization environment 1400 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1400 hosted by one or more of hardware nodes 1430. Further, in embodiments in which the virtual node is not a radio access node or does not require radio connectivity (e.g., a core network node), then the network node may be entirely virtualized.

The functions may be implemented by one or more applications 1420 (which may alternatively be called software instances, virtual appliances, network functions, virtual nodes, virtual network functions, etc.) operative to implement some of the features, functions, and/or benefits of some of the embodiments disclosed herein. Applications 1420 are run in virtualization environment 1400 which provides hardware 1430 comprising processing circuitry 1460 and memory 1490. Memory 1490 contains instructions 1495 executable by processing circuitry 1460 whereby application 1420 is operative to provide one or more of the features, benefits, and/or functions disclosed herein.

Virtualization environment 1400, comprises general-purpose or special-purpose network hardware devices 1430 comprising a set of one or more processors or processing circuitry 1460, which may be commercial off-the-shelf (COTS) processors, dedicated Application Specific Integrated Circuits (ASICs), or any other type of processing circuitry including digital or analog hardware components or special purpose processors. Each hardware device may comprise memory 1490-1 which may be non-persistent memory for temporarily storing instructions 1495 or software executed by processing circuitry 1460. Each hardware device may comprise one or more network interface controllers (NICs) 1470, also known as network interface cards, which include physical network interface 1480. Each hardware device may also include non-transitory, persistent, machine-readable storage media 1490-2 having stored therein software 1495 and/or instructions executable by processing circuitry 1460. Software 1495 may include any type of software including software for instantiating one or more virtualization layers 1450 (also referred to as hypervisors), software to execute virtual machines 1440 as well as software allowing it to execute functions, features and/or benefits described in relation with some embodiments described herein.

Virtual machines 1440, comprise virtual processing, virtual memory, virtual networking or interface and virtual storage, and may be run by a corresponding virtualization layer 1450 or hypervisor. Different embodiments of the instance of virtual appliance 1420 may be implemented on one or more of virtual machines 1440, and the implementations may be made in different ways.

During operation, processing circuitry 1460 executes software 1495 to instantiate the hypervisor or virtualization layer 1450, which may sometimes be referred to as a virtual machine monitor (VMM). Virtualization layer 1450 may present a virtual operating platform that appears like networking hardware to virtual machine 1440.

As shown in FIG. 14, hardware 1430 may be a standalone network node with generic or specific components. Hardware 1430 may comprise antenna 14225 and may implement some functions via virtualization. Alternatively, hardware 1430 may be part of a larger cluster of hardware (e.g., such as in a data center or customer premise equipment (CPE)) where many hardware nodes work together and are managed via management and orchestration (MANO) 14100, which, among others, oversees lifecycle management of applications 1420.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1440 may be a software implementation of a physical machine that runs programs as if they were executing on a physical, non-virtualized machine. Each of virtual machines 1440, and that part of hardware 1430 that executes that virtual machine, be it hardware dedicated to that virtual machine and/or hardware shared by that virtual machine with others of the virtual machines 1440, forms a separate virtual network element (VNE).

Still in the context of NFV, Virtual Network Function (VNF) is responsible for handling specific network functions that run in one or more virtual machines 1440 on top of hardware networking infrastructure 1430 and corresponds to application 1420 in FIG. 14.

In some embodiments, one or more radio units 14200 that each include one or more transmitters 14220 and one or more receivers 14210 may be coupled to one or more antennas 14225. Radio units 14200 may communicate directly with hardware nodes 1430 via one or more appropriate network interfaces and may be used in combination with the virtual components to provide a virtual node with radio capabilities, such as a radio access node or a base station.

In some embodiments, some signalling can be effected with the use of control system 14230 which may alternatively be used for communication between the hardware nodes 1430 and radio units 14200.

Figure 15:
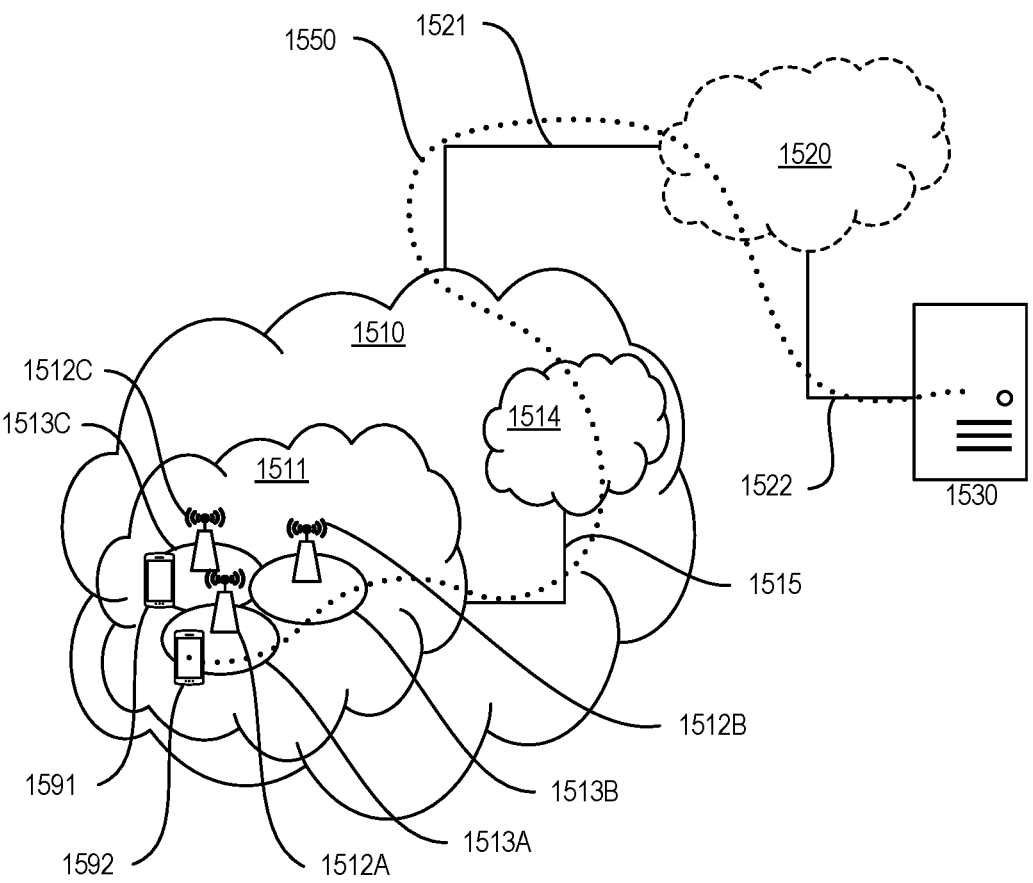
FIG. 15 illustrates a telecommunications network connected via an intermediate network to a host computer in accordance with some embodiments.

With reference to FIG. 15, in accordance with an embodiment, a communication system includes telecommunication network 1510, such as a 3GPP-type cellular network, which comprises access network 1511, such as a radio access network, and core network 1514. Access network 1511 comprises a plurality of base stations 1512*a*, 1512*b*, 1512*c*, such as NBs, eNBs, gNBs or other types of wireless access points, each defining a corresponding coverage area 1513*a*, 1513*b*, 1513*c*. Each base station 1512*a*, 1512*b*, 1512*c* is connectable to core network 1514 over a wired or wireless connection 1515. A first UE 1591 located in coverage area 1513*c* is configured to wirelessly connect to, or be paged by, the corresponding base station 1512*c*. A second UE 1592 in coverage area 1513*a* is wirelessly connectable to the corresponding base station 1512*a*. While a plurality of UEs 1591, 1592 are illustrated in this example, the disclosed embodiments are equally applicable to a situation where a sole UE is in the coverage area or where a sole UE is connecting to the corresponding base station 1512.

Telecommunication network 1510 is itself connected to host computer 1530, which may be embodied in the hardware and/or software of a standalone server, a cloud-implemented server, a distributed server or as processing resources in a server farm. Host computer 1530 may be under the ownership or control of a service provider, or may be operated by the service provider or on behalf of the service provider. Connections 1521 and 1522 between telecommunication network 1510 and host computer 1530 may extend directly from core network 1514 to host computer 1530 or may go via an optional intermediate network 1520. Intermediate network 1520 may be one of, or a combination of more than one of, a public, private or hosted network; intermediate network 1520, if any, may be a backbone network or the Internet; in particular, intermediate network 1520 may comprise two or more sub-networks (not shown).

The communication system of FIG. 15 as a whole enables connectivity between the connected UEs 1591, 1592 and host computer 1530. The connectivity may be described as an over-the-top (OTT) connection 1550. Host computer 1530 and the connected UEs 1591, 1592 are configured to communicate data and/or signaling via OTT connection 1550, using access network 1511, core network 1514, any intermediate network 1520 and possible further infrastructure (not shown) as intermediaries. OTT connection 1550 may be transparent in the sense that the participating communication devices through which OTT connection 1550 passes are unaware of routing of uplink and downlink communications. For example, base station 1512 may not or need not be informed about the past routing of an incoming downlink communication with data originating from host computer 1530 to be forwarded (e.g., handed over) to a connected UE 1591. Similarly, base station 1512 need not be aware of the future routing of an outgoing uplink communication originating from the UE 1591 towards the host computer 1530.

Example implementations, in accordance with an embodiment, of the UE, base station and host computer discussed in the preceding paragraphs will now be described with reference to FIG. 16. In communication system 1600, host computer 1610 comprises hardware 1615 including communication interface 1616 configured to set up and maintain a wired or wireless connection with an interface of a different communication device of communication system 1600. Host computer 1610 further comprises processing circuitry 1618, which may have storage and/or processing capabilities. In particular, processing circuitry 1618 may comprise one or more programmable processors, application-specific integrated circuits, field programmable gate arrays or combinations of these (not shown) adapted to execute instructions. Host computer 1610 further comprises software 1611, which is stored in or accessible by host computer 1610 and executable by processing circuitry 1618. Software 1611 includes host application 1612. Host application 1612 may be operable to provide a service to a remote user, such as UE 1630 connecting via OTT connection 1650 terminating at UE 1630 and host computer 1610. In providing the service to the remote user, host application 1612 may provide user data which is transmitted using OTT connection 1650.

Communication system 1600 further includes base station 1620 provided in a telecommunication system and comprising hardware 1625 enabling it to communicate with host computer 1610 and with UE 1630. Hardware 1625 may include communication interface 1626 for setting up and maintaining a wired or wireless connection with an interface of a different communication device of communication system 1600, as well as radio interface 1627 for setting up and maintaining at least wireless connection 1670 with UE 1630 located in a coverage area (not shown in FIG. 16) served by base station 1620. Communication interface 1626 may be configured to facilitate connection 1660 to host computer 1610. Connection 1660 may be direct or it may pass through a core network (not shown in FIG. 16) of the telecommunication system and/or through one or more intermediate networks outside the telecommunication system. In the embodiment shown, hardware 1625 of base station 1620 further includes processing circuitry 1628, which may comprise one or more programmable processors, application-specific integrated circuits, field programmable gate arrays or combinations of these (not shown) adapted to execute instructions. Base station 1620 further has software 1621 stored internally or accessible via an external connection.

Communication system 1600 further includes UE 1630 already referred to. Its hardware 1635 may include radio interface 1637 configured to set up and maintain wireless connection 1670 with a base station serving a coverage area in which UE 1630 is currently located. Hardware 1635 of UE 1630 further includes processing circuitry 1638, which may comprise one or more programmable processors, application-specific integrated circuits, field programmable gate arrays or combinations of these (not shown) adapted to execute instructions. UE 1630 further comprises software 1631, which is stored in or accessible by UE 1630 and executable by processing circuitry 1638. Software 1631 includes client application 1632. Client application 1632 may be operable to provide a service to a human or non-human user via UE 1630, with the support of host computer 1610. In host computer 1610, an executing host application 1612 may communicate with the executing client application 1632 via OTT connection 1650 terminating at UE 1630 and host computer 1610. In providing the service to the user, client application 1632 may receive request data from host application 1612 and provide user data in response to the request data. OTT connection 1650 may transfer both the request data and the user data. Client application 1632 may interact with the user to generate the user data that it provides.

Figure 16:
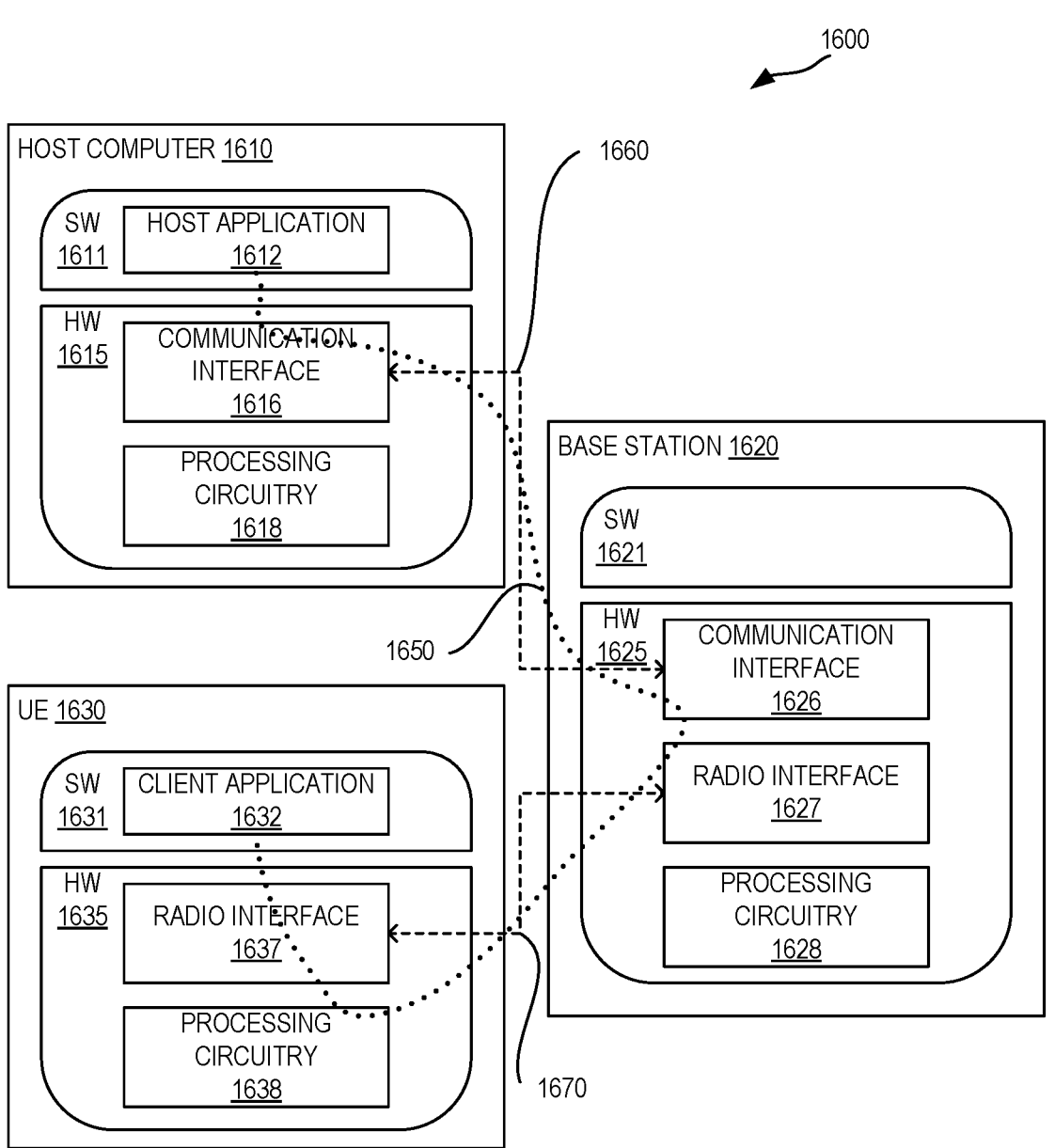
FIG. 16 illustrates a host computer communicating via a base station with a UE over a partially wireless connection in accordance with some embodiments.

It is noted that host computer 1610, base station 1620 and UE 1630 illustrated in FIG. 16 may be similar or identical to host computer 1530, one of base stations 1512a, 1512b, 1512c and one of UEs 1591, 1592 of FIG. 15, respectively. This is to say, the inner workings of these entities may be as shown in FIG. 16 and independently, the surrounding network topology may be that of FIG. 15.

In FIG. 16, OTT connection 1650 has been drawn abstractly to illustrate the communication between host computer 1610 and UE 1630 via base station 1620, without explicit reference to any intermediary devices and the precise routing of messages via these devices. Network infrastructure may determine the routing, which it may be configured to hide from UE 1630 or from the service provider operating host computer 1610, or both. While OTT connection 1650 is active, the network infrastructure may further take decisions by which it dynamically changes the routing (e.g., on the basis of load balancing consideration or reconfiguration of the network).

Wireless connection 1670 between UE 1630 and base station 1620 is in accordance with the teachings of the embodiments described throughout this disclosure. One or more of the various embodiments improve the performance of OTT services provided to UE 1630 using OTT connection 1650, in which wireless connection 1670 forms the last segment. More precisely, the teachings of these embodiments may improve the date rate, latency, power consumption, and thereby provide benefits such as, for example, reduced user waiting time, relaxed restriction on file size, better responsiveness, and extended battery lifetime.

A measurement procedure may be provided for the purpose of monitoring data rate, latency and other factors on which the one or more embodiments improve. There may further be an optional network functionality for reconfiguring OTT connection 1650 between host computer 1610 and UE 1630, in response to variations in the measurement results. The measurement procedure and/or the network functionality for reconfiguring OTT connection 1650 may be implemented in software 1611 and hardware 1615 of host computer 1610 or in software 1631 and hardware 1635 of UE 1630, or both. In embodiments, sensors (not shown) may be deployed in or in association with communication devices through which OTT connection 1650 passes; the sensors may participate in the measurement procedure by supplying values of the monitored quantities exemplified above, or supplying values of other physical quantities from which software 1611, 1631 may compute or estimate the monitored quantities. The reconfiguring of OTT connection 1650 may include message format, retransmission settings, preferred routing etc.; the reconfiguring need not affect base station 1620, and it may be unknown or imperceptible to base station 1620. Such procedures and functionalities may be known and practiced in the art. In certain embodiments, measurements may involve proprietary UE signaling facilitating host computer 1610's measurements of throughput, propagation times, latency and the like. The measurements may be implemented in that software 1611 and 1631 causes messages to be transmitted, in particular empty or 'dummy' messages, using OTT connection 1650 while it monitors propagation times, errors etc.

Figures 17, 18:
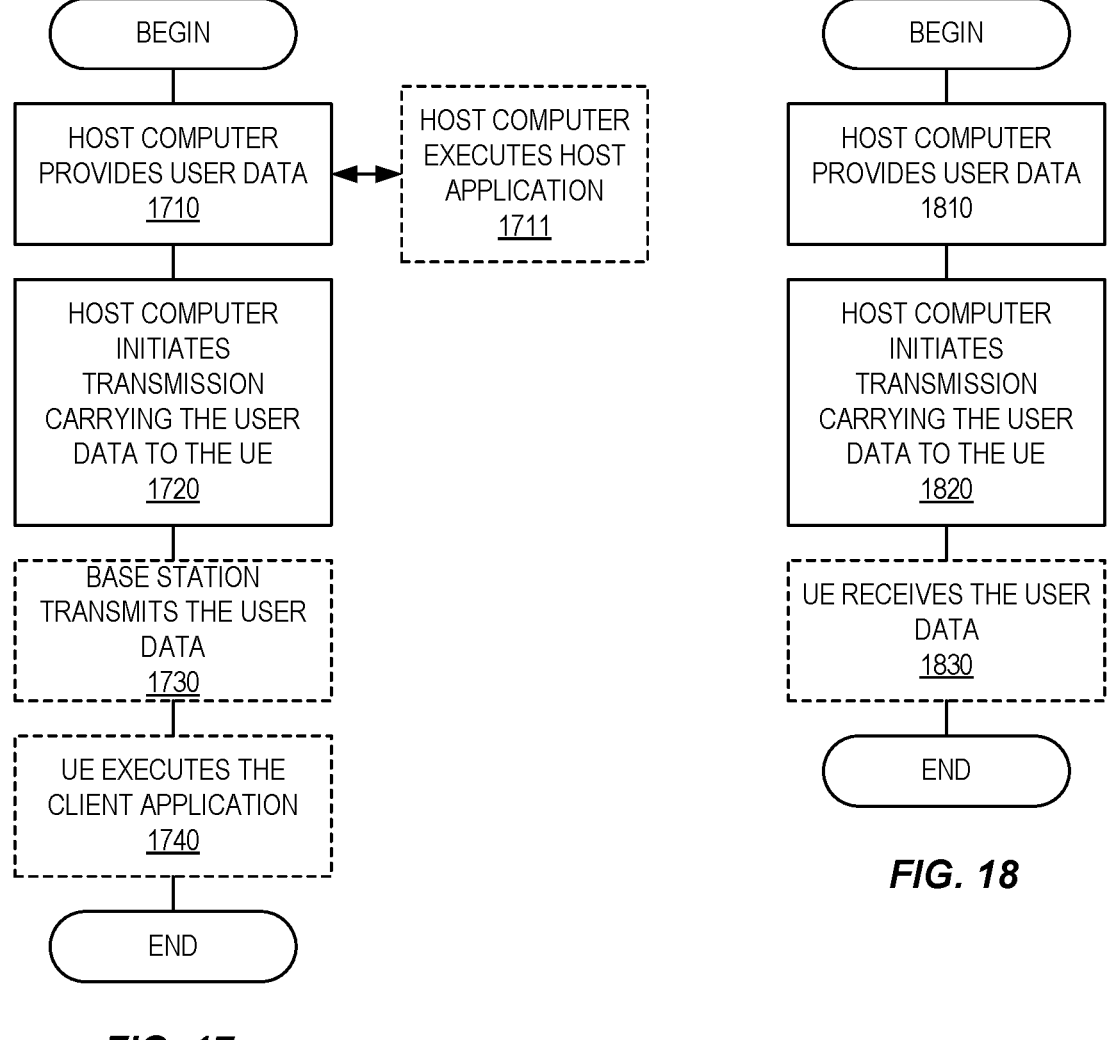
FIGS. 17, 18, 19, and 20 illustrate methods implemented in a communication system including a host computer, a base station, and a UE in accordance with some embodiments.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In step 1710, the host computer provides user data. In substep 1711 (which may be optional) of step 1710, the host computer provides the user data by executing a host application. In step 1720, the host computer initiates a transmission carrying the user data to the UE. In step 1730 (which may be optional), the base station transmits to the UE the user data which was carried in the transmission that the host computer initiated, in accordance with the teachings of the embodiments described throughout this disclosure. In step 1740 (which may also be optional), the UE executes a client application associated with the host application executed by the host computer.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In step 1810 of the method, the host computer provides user data. In an optional substep (not shown) the host computer provides the user data by executing a host application. In step 1820, the host computer initiates a transmission carrying the user data to the UE. The transmission may pass via the base station, in accordance with the teachings of the embodiments described throughout this disclosure. In step 1830 (which may be optional), the UE receives the user data carried in the transmission.

Figures 19, 20:
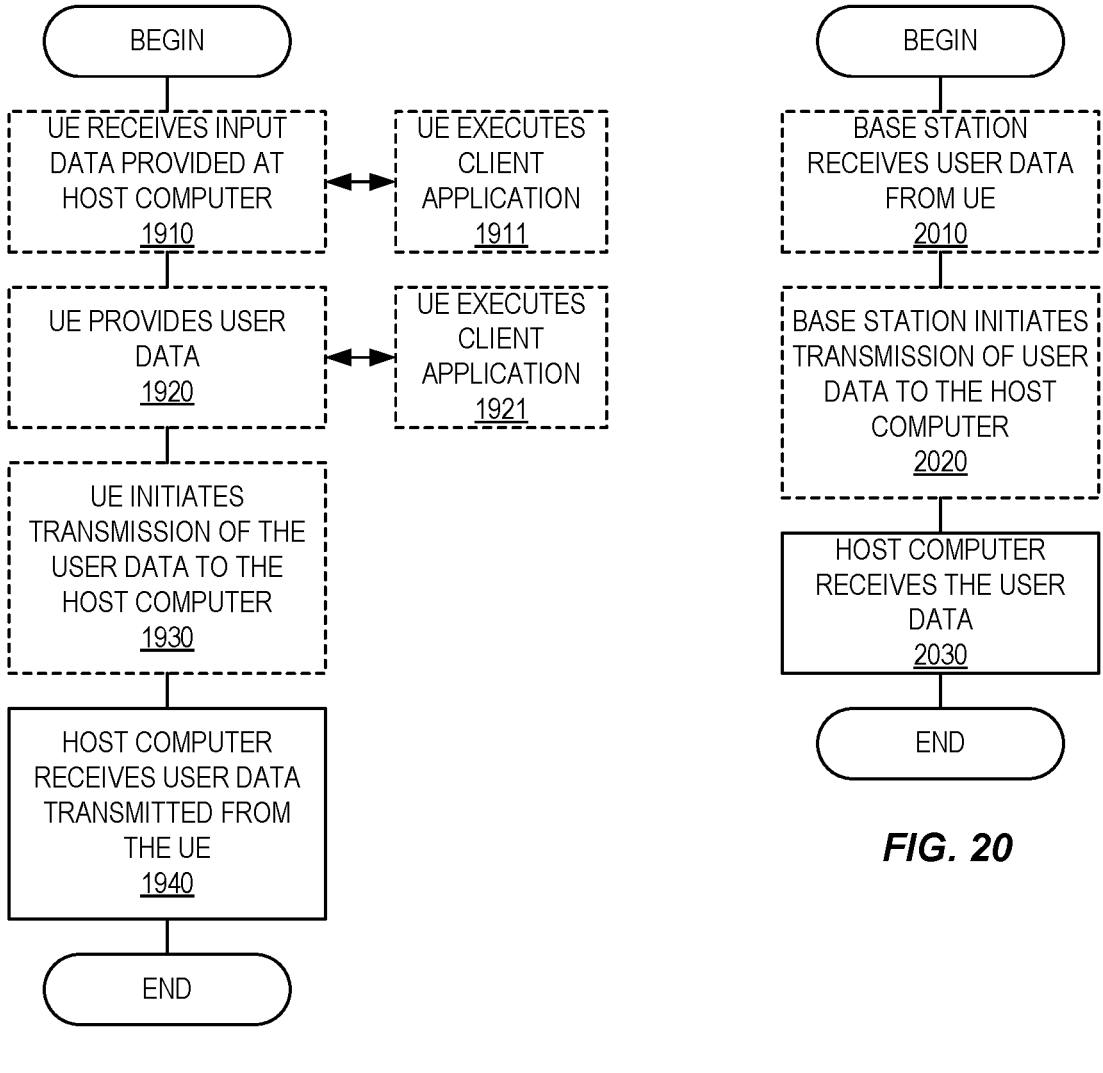

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In step 1910 (which may be optional), the UE receives input data provided by the host computer. Additionally or alternatively, in step 1920, the UE provides user data. In substep 1921 (which may be optional) of step 1920, the UE provides the user data by executing a client application. In substep 1911 (which may be optional) of step 1910, the UE executes a client application which provides the user data in reaction to the received input data provided by the host computer. In providing the user data, the executed client application may further consider user input received from the user. Regardless of the specific manner in which the user data was provided, the UE initiates, in substep 1930 (which may be optional), transmission of the user data to the host computer. In step 1940 of the method, the host computer receives the user data transmitted from the UE, in accordance with the teachings of the embodiments described throughout this disclosure.

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In step 2010 (which may be optional), in accordance with the teachings of the embodiments described throughout this disclosure, the base station receives user data from the UE. In step 2020 (which may be optional), the base station initiates transmission of the received user data to the host computer. In step 2030 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method performed by a secondary node, the method comprising:

receiving a request from a master node for a conditional secondary node addition, the request comprising information that indicates a request for Conditional Primary Secondary Cell, PSCell, Addition, CPA, for one or more PSCells;

transmitting, to the master node, a response to the request that confirms that a User Equipment, UE, may be accepted for CPA for the one or more PSCells unless a canceling indication is later received; and sending, to the master node, a message that indicates that the CPA is cancelled for at least one of the one or more PSCells;

wherein the message that indicates that the CPA is cancelled for at least one of the one or more PSCells comprises a list indicating for which of the one or more PSCells the CPA is cancelled.

2. The method of claim 1, wherein sending the message that indicates that the CPA is cancelled for at least one of the one or more PSCells is triggered by the secondary node upon detection of an overload condition.

3. The method of claim 1, wherein sending the message that indicates that the CPA is cancelled for at least one of the one or more PSCells is triggered by the secondary node upon detection of a need to utilize resources allocated for CPA.

4. The method of claim 1, wherein sending the message that indicates that the CPA is cancelled for at least one of the one or more PSCells is triggered by the secondary node upon expiration of a resource reservation timer managed by the secondary node.

5. The method of claim 1, wherein the message that indicates that the CPA is cancelled for at least one of the one or more PSCells is an S-NODE RELEASE REQUIRED message comprising a list of the one or more PSCells for which the CPA is cancelled.

6. A secondary node adapted to:

receive a request from a master node for a conditional secondary node addition, the request comprising information that indicates a request for a Conditional Primary Secondary Cell, PSCell, Addition, CPA, for one or more PSCells;

transmit, to the master node, a response to the request that confirms that a User Equipment, UE, may be accepted for CPA for the one or more PSCells unless a canceling indication is later received; and send, to the master node, a message that indicates that the CPA is cancelled for at least one of the one or more PSCells;

wherein the message that indicates that the CPA is cancelled for at least one of the one or more PSCells comprises a list indicating for which of the one or more PSCells the CPA is cancelled.

7. A method performed by a master node, the method comprising:

receiving, from a secondary node, a message that indicates that Conditional Primary Secondary Cell, PSCell, Addition, CPA, is cancelled for at least one of one or more PSCells for which CPA was previously requested; and sending, to a User Equipment, UE, a Radio Resource Control, RRC, reconfiguration message that removes CPA related configurations for the at least one of the one or more PSCells for which CPA is cancelled;

wherein the message that indicates that the CPA is cancelled for at least one of the one or more PSCells comprises a list indicating for which of the one or more PSCells the CPA is cancelled.

8. The method of claim 7, wherein the message that indicates that CPA is cancelled for the at least one of the one or more PSCells is an S-NODE RELEASE REQUIRED message, and the S-NODE RELEASE REQUIRED message comprises a list of the at least one of the one or more PSCells for which CPA is cancelled.

9. The method of claim 7, wherein the message that indicates that CPA is cancelled for the at least one of the one or more PSCells is an S-NODE RELEASE REQUIRED message, and the S-NODE RELEASE REQUIRED message comprises a conditional reconfiguration ID(s) for the at least one of the one or more PSCells for which CPA is cancelled.

10. The method of claim 7, wherein the message that indicates that the CPA is cancelled for at least one of the one or more PSCells is a new message comprising a list of the one or more PSCells for which the CPA is cancelled.

11. The method of claim 7, wherein an original RRC message sent to the UE to configure the UE for CPA for the one or more PSCells was generated by the master node, and the method further comprises generating the RRC reconfiguration message that removes the CPA related configurations for the at least one of the one or more PSCells for which CPA is cancelled.

12. A master node adapted to:

receive, from a secondary node, a message that indicates that Conditional Primary Secondary Cell, PSCell, Addition, CPA, is cancelled for at least one of one or more PSCells for which CPA was previously requested; and send, to a User Equipment, UE, a Radio Resource Control, RRC, reconfiguration message that removes CPA related configurations for the at least one of the one or more PSCells for which CPA is cancelled;

wherein the message that indicates that the CPA is cancelled for at least one of the one or more PSCells comprises a list indicating for which of the one or more PSCells the CPA is cancelled.

* * * * *